(12) United States Patent
Green et al.

(10) Patent No.: US 12,521,651 B2
(45) Date of Patent: Jan. 13, 2026

(54) MECHANICAL DEMOISTURIZING OF PARTIALLY-DECOMPOSED ORGANIC MATERIAL

(71) Applicant: American Peat Technology, LLC, Aitkin, MN (US)

(72) Inventors: Douglas A. Green, Crosby, MN (US); David L. Schaeffer, Brainerd, MN (US)

(73) Assignee: American Peat Technology, LLC, Aitkin, MN (US)

( * ) Notice: Subject to any disclaimer, the term of this patent is extended or adjusted under 35 U.S.C. 154(b) by 559 days.

(21) Appl. No.: 17/945,219

(22) Filed: Sep. 15, 2022

(65) Prior Publication Data

US 2024/0091679 A1 Mar. 21, 2024

(51) Int. Cl.
*B01D 25/21* (2006.01)
*B01D 25/164* (2006.01)
(Continued)

(52) U.S. Cl.
CPC ....... *B01D 25/215* (2013.01); *B01D 25/1645* (2013.01); *B01D 25/284* (2013.01);
(Continued)

(58) Field of Classification Search
None
See application file for complete search history.

(56) References Cited

U.S. PATENT DOCUMENTS

| | | |
|---|---|---|
| 1,290,494 A | 1/1919 | Ten et al. |
| 2,704,895 A | 3/1955 | Cederquist |

(Continued)

OTHER PUBLICATIONS

Walford, Susanne Elizabeth, "Environmental Considerations for Wet Mining Peatlands in Northwestern Ontario", thesis presented to The Faculty of Graduate Studies of Lakehead University, Oct. 13, 2011.

(Continued)

*Primary Examiner* — Peter Keyworth
(74) *Attorney, Agent, or Firm* — Pauly, DeVries Smith & Deffner LLC

(57) ABSTRACT

A process for the preparation of a concentrated filter cake from an admixture of partially-decomposed organic material and a polar liquid using a filter press without the input of thermal heat or superheated steam or other pressurized gas or liquid is provided by this invention. The admixture is mixed with an additional amount of the polar liquid to produce a feed slurry of the admixture having a moisture content of about 90-99% wt. The resulting slurry admixture is then introduced into the filter press having a plurality of filter plates with porous membranes secured along their outlet. The pressure condition introduced inside the filter plate chambers is increased by a pressurized gas or liquid to force the polar liquid from the admixture slurry though apertures contained in the membrane, thereby leaving a filter cake of the partially-decomposed organic material having a moisture content that is lower than the moisture content of the initial partially-decomposed organic material feed. The process and its equipment may be used to treat a variety of partially-decomposed organic material/polar liquid slurry admixtures, including high moisture peat containing water, and reduce the moisture content of the resulting peat filter cake to as low as 60% wt for peat or about 50% wt for a peat/Biochar admixture.

32 Claims, 21 Drawing Sheets

(51) Int. Cl.
    *B01D 25/28*     (2006.01)
    *B01D 25/34*     (2006.01)
    *B01D 37/02*     (2006.01)
    *B01D 37/03*     (2006.01)

(52) U.S. Cl.
    CPC ............. *B01D 25/34* (2013.01); *B01D 37/02* (2013.01); *B01D 37/03* (2013.01)

(56) References Cited

U.S. PATENT DOCUMENTS

| | | |
|---|---|---|
| 4,357,758 A | 11/1982 | Lampinen |
| 4,417,982 A | 11/1983 | Britschgi et al. |
| 4,447,334 A | 5/1984 | Britschgi et al. |
| 4,525,172 A | 6/1985 | Eriksson |
| 4,526,607 A | 7/1985 | Rosenberg |
| 4,543,881 A | 10/1985 | Anderson |
| 4,720,287 A | 1/1988 | Sheppard et al. |
| 4,895,577 A | 1/1990 | Chornet et al. |
| 5,154,825 A | 10/1992 | Kupka |
| 5,474,675 A | 12/1995 | Kupka |
| 5,477,627 A | 12/1995 | Nolin et al. |
| 6,260,511 B1 | 7/2001 | Hsu |
| 6,499,232 B2 | 12/2002 | Bielfeldt |
| 6,502,326 B1 | 1/2003 | Bielfeldt |
| 6,526,675 B1 | 3/2003 | Yoon |
| 6,875,350 B2 | 4/2005 | Allard |
| 7,820,058 B2 | 10/2010 | Yoon |
| 7,992,319 B2 | 8/2011 | Wilson |
| 8,067,193 B2 | 11/2011 | Hughes et al. |
| 8,088,288 B2 | 1/2012 | Whittaker et al. |
| 8,181,794 B2 | 5/2012 | McGinnis et al. |
| 8,232,225 B2 | 7/2012 | Green et al. |
| 8,460,554 B2 | 6/2013 | McGinnis et al. |
| 8,685,884 B2 | 4/2014 | Green et al. |
| 8,940,173 B2 | 1/2015 | Bakajin et al. |
| 9,010,544 B1 | 4/2015 | Miller |
| 9,561,489 B2 | 2/2017 | Kolomitsyn et al. |
| 9,649,620 B2 | 5/2017 | Kolomitsyn et al. |
| 9,789,492 B2 | 10/2017 | Yoon et al. |
| 10,072,214 B1 | 9/2018 | Green et al. |
| 2007/0187328 A1 | 8/2007 | Gordon |
| 2024/0091678 A1 | 3/2024 | Green et al. |

OTHER PUBLICATIONS

"International Search Report and Written Opinion," for PCT Patent Application No. PCT/US2023/032836 mailed Jan. 8, 2024 (9 pages).

"International Preliminary Report on Patentability," for PCT Patent Application No. PCT/US2023/032836 mailed Mar. 27, 2025 (7 pages).

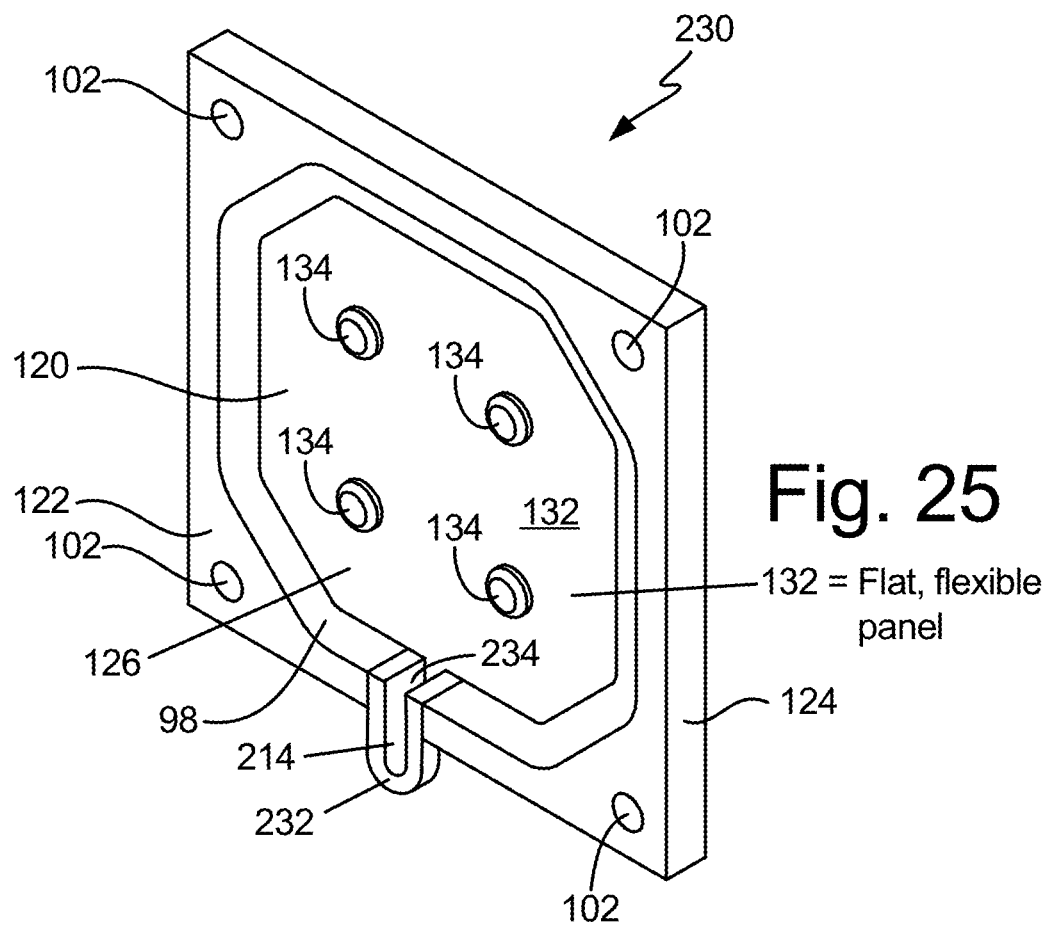
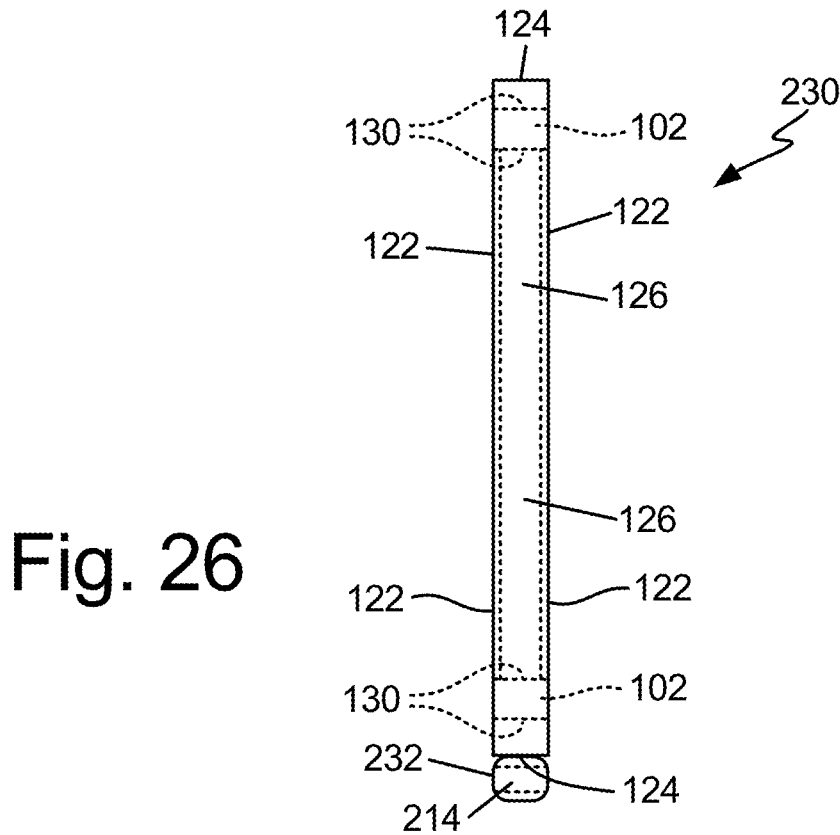

MECHANICAL DEMOISTURIZING OF PARTIALLY-DECOMPOSED ORGANIC MATERIAL

FIELD OF THE INVENTION

This invention relates to the reduction of the moisture content of partially-decomposed organic material such as peat, and more specifically, a process for the mechanical demoisturizing of polar liquids contained in such partially-decomposed organic material after creating a high-moisture slurry to produce material of uniformly reduced moisture content, utilizing heat and materials values sourced from the surrounding production system.

BACKGROUND OF THE INVENTION

Peat represents a partially-decomposed organic material formed by an accumulated heterogeneous mixture of partially-decomposed vegetation and inorganic minerals over long periods of time. It forms naturally in wetland conditions in bogs, ferns, pocosins, and peat swamp forests, where flood water obstructs flows of oxygen from the atmosphere, thereby slowing normal rates of decomposition. The resulting pale upper layers contain the remains of the plants, herbs, and moss that died and rotted below the shallow acid water. They are compressed by the weight of the water and other plants to form a fine amorphic, colloidal mass. The lower layers of the peat material constitute approximately 90% water, and resemble mud.

Peat wetlands are found in over 175 countries in the world, and cover around three percent of the world's land area. Significant peat deposits exist in Canada, Finland, the former Soviet Union, Scotland, Ireland, England, France, Germany, and a number of other European countries. The United States also contains significant peat deposits, particularly in Minnesota and Alaska.

Most peat is harvested from these peatland bogs and other wetlands by very large machinery. Generally, the peatland fields are divided into smaller fields by means of perimeter furrows that collect some of the water from the upper layer of the fields. For reed sedge peat, machines are used to dig, chop, and mix the peat from this upper layer and form it into blocks. The excavated peat contains around 95-96% moisture. The peat is then stored in the peatland fields to drain and air dry under the influence of solar heat. Over the course of 9-12 months, the moisture content of the reed sedge peat may be reduced to approximately 80-86%, assuming that little rain falls on the field. Over the course of four years, the reed sedge peat blocks may be reduced to a moisture content of approximately 70%.

Alternatively, the reed sedge peat is disked in the field to fluff up the top layer and then stockpiled in windrows within the until they can be hauled off at a later date. Reed sedge peat is less fibrous than other types of peat, and does not therefore air dry particularly well. Thus, the production costs for field harvesting peat are increased by these long time periods required to reduce moisture content.

Sphagnum peat, on the other hand, is much more-fibrous than reed sedge peat, and is more suitable for air drying on the field. Typically, its top one-inch layer will be disk cut and milled in the field to loosen it up. Then a large vacuum harvester sucks up the loosed Sphagnum peat material and produces around 35% moisture peat. But this is a very expensive, capital intensive process that can only be carried out during a couple months of the year when rain is largely non-existent. Thus, harvesting of Sphagnum peat is a low-volume process.

Peat is used for energy generation, horticultural, and industrial purposes. In many countries, peat is burned as a source of heating fuel, although its moisture content must be further reduced to below 15% to render it an efficient source of thermal heat. Its use in agriculture or horticulture, as a top soil, potting soil, or mulch dressing for retaining moisture in container soil when it is dry, while preventing excess water from killing plant roots during wet conditions, allows for around 60%-moisture material. Peat is also used in freshwater aquaria and water filtration, such as the treatment of septic tank effluent and urban runoff.

American Peat Technology of Aitkin, Minnesota has developed proprietary technology for making peat pellets that may be used as carriers for agricultural treatments like Rhizobia microorganisms that produce nitrogen in plant roots, and thermally-activated peat granules that efficiently adsorb heavy metals from wastewater. In conjunction with the University of Minnesota, it has also developed chemically-modified, thermally-activated peat granules that can reduce the leaching of contaminants naturally found in peat into the wastewater during wastewater treatment processes, or selectively adsorb particular heavy metals like cadmium found in the wastewaters at the expense of less-toxic metal cations like zinc. See U.S. Pat. Nos. 8,232,255 and 8,685,884 issued to Green, et al.; and U.S. Ser. Nos. 13/841,526 and 14/213,677 filed by Kolomitsyn, et al., all of which are hereby incorporated by reference. The moisture content of these specialty granulated agricultural and industrial products made from peat must typically be around 1-14%.

Because solar heat and field draining generally are inadequate to reduce the natural moisture in peat down to a level acceptable for these end applications, supplemental drying is required. Manufacturers of peat-related products often employ thermal drying processes to reduce the moisture content of the peat material to an acceptable level. For example, U.S. Pat. No. 7,992,319 issued to Wilson discloses a dryer for coal or peat pellets. Fed into the top of the vertical dryer, the pellets fall through the interior chamber, being exposed to horizontally directed drying gas flow along the way. The dried pellets are removed from the bottom of the dryer chamber.

U.S. Pat. No. 1,290,494 issued to Ten Bosch, N.J. Zoom shows a peat dryer formed by a vertical tower with a decreasing cross-sectional area from the top of the tower to its bottom, ending in a discharge funnel. As the peat is continuously fed through the top of the tower, it is heated by means of a steam supply introduced into the tower chamber. After being subjected to this heat treatment, the peat passes down to a perforated cylinder where the pressure amounts to approximately 79 lbs/in$^2$. Owing to this high pressure condition, water is forced out of the peat to a discharge pipe. The dried peat product falls into the discharge funnel for removal.

U.S. Pat. No. 2,704,895 issued to Cederquist discloses a process in which peat or other vegetable material is fed into a pressure vessel in which it is oxidized under constant elevated temperature and pressure of around 180° C. and 20 atm. Steam and gases are removed from the vessel doing this oxidation process. The oxidized peat is then transferred to an expansion chamber and allowed to expand whereupon steam generated by the pressure drop is discharged from the vessel to further dry the peat. The peat material is then blown to a dryer by means of air. However, this process is limited to peat feed having a dryness of at least 25%. Moreover, these thermal drying processes can be expensive to operate due to substantial equipment costs and the necessary thermal heat for the dryer which can substantially increase operating costs depending upon the combustion fuel used. It is particularly ironic to produce and expend thermal heat for a dryer used to dry peat for use as a combustion product.

Manufacturers in the peat industry have therefore resorted to mechanical processes for dewatering peat. U.S. Pat. No. 5,477,627 issued to Nolin et al. illustrates an attachment mounted to the end of the articulated boom of a carrier vehicle for harvesting peat. The attachment comprises an apertured container having a reciprocating ram. Peat is dug from the bog and placed into the container whereupon the ram extends within the container to reduce the interior volume holding the peat, and force water out through the apertures in the container walls. This attachment can reduce the weight of the material by up to 50%, but considering the comparative density of water versus peat, a significant quantity of the water remains within the peat.

U.S. Pat. No. 4,417,982 issued to Britschgi et al. discloses a wire press machine in which peat is continuously fed along a conveyor screen belt between counter-rotating press rollers to remove water content through holes in the screen. Residual fines are sprayed off the screens, filtered to remove water, and recycled to the peat feed stream. U.S. Pat. No. 4,447,334 also issued to Britschgi et al. dewaters peat by breaking it into 2-3 cm particles, passing the resulting particles along conveyor belts and counter-rotating rollers, and then through a series of nip rollers at increasingly higher pressures to produce peat filter cake.

U.S. Pat. No. 4,526,607 issued to Rosenberg shows a two-step mechanical system for dewatering peat. The first stage comprises of a double machine wire press having a plurality of pairs of rollers that squeeze water out of the peat material as it passes between the counter-rotating rollers. The second stage consists of a filter press featuring at least two successive filter press chambers. The system can reduce the moisture content of the peat feed material from 90% to 45-55%.

But these prior art processes that use roller presses can be problematic. Not only can the equipment, maintenance, and operating costs be substantial, but it has been found that when roller presses are employed to squeeze peat material, the roller press divides the peat into a fines fraction that is lost with the separated water fraction, and a fibrous fraction that is produced by the roller press. This results in a significant change in the composition of the dewatered peat product. For example, peat containing a low concentration of fine particles and extra fibrous particles can be unusable for bacterial growth when the peat is used as a carrier medium for microorganisms.

U.S. Pat. No. 4,543,881 issued to Anderson discloses a dewatering machine for peat or other material having low tensile strength. The machine has an outer roll and an eccentrically-positioned inner roll that squeezes the material to produce severe mechanical compression and shear action. Peat having 90% moisture content can be reduced to 50% moisture content by means of this machine.

U.S. Pat. No. 4,357,758 issued to Lampinen illustrates a system in which peat is placed on a sinter plate saturated with water exposed to water contained in a vessel maintained at sub-atmospheric pressure. A water layer is formed by means of the water on the plate and inside the peat material. The pressure differential across the plate causes water to flow out of the peat through holes in the sinter plate and into the vessel, thereby reducing the moisture content of the peat.

Some manufacturers of peat-based products have resorted to thermo-mechanical dewatering processes. For example, U.S. Pat. No. 4,895,577 issued to Chornet et al. is directed to a system in which the peat is macerated and then mixed with water to produce an 86% moisture slurry. The resulting peat slurry is then heated inside a reactor to a temperature of 160-200° C. by means of steam, followed by mechanical shear and post hydrolysis for a time period of roughly 1-3 minutes. The mechanical shear is preferably achieved by means of passing the slurry through narrow orifices in a nozzle contained in the reactor. The product can then be treated inside a filter press to produce a final peat product having 50-60% moisture. It is quenched rapidly to reduce the temperature to 100° C. or lower in order to terminate the hydrolytic and other reactions within the slurry.

Meanwhile, U.S. Pat. No. 4,525,172 issued to Ericksson discloses a thermo-mechanical system in which peat is dewatered by means of pressing it at a temperature exceeding 90° C. and displacing water contained in the peat by means of warmer water under increasing pressure conditions inside a closed wash press. The peat material is then passed through a mechanical roller press and dried. But the resulting peat material still contains roughly 80% moisture in the press cake before the drying step.

But, these thermo-mechanical systems suffer from a combination of high thermal heat costs and mechanical equipment costs without resulting in a reduction of the peat's moisture to below 50%. Such lower moisture levels are necessary for many combustion, agricultural, and industrial end-use applications for peat. Thus, additional thermal drying will be required to reduce the moisture content of the peat products to acceptable levels despite the usage of the thermal-mechanical dewatering processes.

Some manufacturers have turned to chemical additives to assist with thermal or mechanical dewatering processes. For instance, U.S. Pat. No. 4,720,287 issued to Sheppard et al. teaches a process in which the peat material is heated to 100-150° F. and then treated with a surface active agent like a cationic polymeric surface active agent. The peat is then mechanically pressed at a pressure of 20 atm. Chitosan chloride or an ester of a polyamniocarbonic acid are examples of the chemical agent.

U.S. Pat. No. 8,067,193 issued to Hughes et al. discloses a process for separating solids from a fermentation liquor at a temperature of at least 50° C. using distillation and an anionic polymer selected from natural polymers and modified natural polymers having a high anionic charge such that the equivalent weight is below 300. The anionic monomer units of the polymer are selected from the group consisting of (meth)acrylic acids or salts, itaconic acid or salts, and fumaric acid or salts.

U.S. Pat. No. 6,526,675 issued to Yoon is directed to a method for enhancing fine particle dewatering. A surfactant having a high hydrophile liphophile balance (HLB) member is applied to a slurry of the fine particles. Then a lipid oil coating is applied to the particles. These chemical agents disrupt the bonds between the water molecules and the surface of the material contained in the slurry.

By virtue of the enhanced hydrophobicity, the water molecules are destabilized and more readily removed during the mechanical dewatering process. See also U.S. Pat. No. 7,820,058 issued to Yoon.

Mechanical filter presses have been used in the industry for fiber cell material, although not necessarily for peat. U.S. Pat. No. 6,499,232 issued to Bielfeldt is directed to such a mechanical filter press to which is fed a "sandwich" formed from fine particles placed on a moving belt with coarse particles piled on top of the fire particles. Hot water maintained at 200-220° C. is forced down through the sandwich. The sandwich is then subjected to a downward force inside the mechanical press to squeeze water out of the fibrous material. See also U.S. Pat. No. 6,502,326 issued to Bielfeldt.

Many filter presses use permeable membranes to enhance the separation of water from the feed material during the pressing operation to produce the filter cake with reduced moisture content. See, e.g., U.S. Pat. No. 8,088,288 issued to Whittatker et al. (reverse-phase polymer membrane); U.S. Pat. No. 8,940,173 issued to Bakajin et al. (membrane formed from vertically-aligned carbon nanotubes; U.S. Pat. No. 8,460,554 issued to McGinnis et al. (forward osmosis membrane); U.S. Pat. No. 9,010,544 issued to Miller (microporous membrane); U.S. Pat. No. 6,875,350 issued to Allard (dewatering bag containing permeable membranes and chitosan); and U.S. Published Application 2007/0187328 filed by Gordon (filter sock).

A mechanically demoisturizing process for treating partially-decomposed organic material like peat containing a polar liquid like water using a filter press and a permeable membrane that can produce a filter cake with content reduced from about 90% wt or greater to, e.g., about 60% wt for peat or about 50% wt for a peat/Biochar admixture without usage of thermal heat or superheated steam would be beneficial. The process would substantially reduce the need for thermal dryers and other expensive mechanical equipment. Moreover, substantial process efficiencies may be obtained by the beneficial utilization of heat and materials values sourced from the surrounding production process for end products made from that peat material.

SUMMARY OF THE INVENTION

A process for the preparation of a concentrated filter cake from an admixture of partially-decomposed organic material and a polar liquid using a filter press without the input of thermal heat or superheated steam or other pressurized gas or liquid is provided by this invention. The admixture is mixed with an additional amount of the polar liquid contained in the admixture to produce a feed slurry admixture having a moisture content of about 90-99% wt. A coagulant and a flocculant may be added as filter aids to the resulting admixture slurry which is then introduced into the filter press having a plurality of filter plates with porous membranes secured along their outlet. Once filled with the admixture slurry during a fill cycle, the pressure condition introduced inside the filter plate chambers is increased by a pressurized gas or liquid during a squeeze cycle to force the polar liquid from the slurry admixture though apertures formed between the orderly or random-oriented fibers contained in the membrane, thereby leaving a filter cake of the partially-decomposed organic material having a moisture content below the moisture content of the initial partially-decomposed organic material/polar liquid admixture.

One or more of the filter membranes may be pre-coated with fine-particle, partially-decomposed organic material of the same material as the initial partially-decomposed organic material/polar liquid admixture. This pre-coating material achieves increased separation of the filter cake from the filter membrane when the filter press is opened following completion of the squeeze cycle, and to achieve rapid migration of the polar liquid during the fill cycle and the squeeze cycle. At the same time, because this precoated material and the partially-decomposed organic material to be demoisturized are one and the same, no contaminants are introduced into the feel partially-decomposed organic material that must be separately separated to produce a pure demoisturized product. The filter membranes have a smooth face that aids in the release of the filter cake.

A polymer may be added to the slurry admixture to help the polar liquid to migrate from the partially-decomposed organic matter matrix during the squeeze cycle. Moreover, finely-ground particles of calcium carbonate may be added to the polymer to enhance migration of the polar liquid from the slurry admixture during the squeeze cycle.

Hollow support tubes may be inserted into the through holes in the cavity plates and expansion plates making up the filter press, these through holes collectively producing a central core passageway through which the slurry admixture flows into a slurry fill chamber during a fill cycle. The bottom edges of the filter membranes are attached to the ends of the support tubes to reduce drooping of the filter membranes into the central core passageway that might otherwise cause abrasion of the filter membranes by the passing slurry admixture, and require premature replacement of the filter membranes.

The resulting filter cake is uniform in its consistency. It may be introduced to a dryer or other thermal or mechanical dewatering apparatus to further remove some of the polar liquid from the partially-decomposed organic material in order to reduce its moisture content to meet the requirements for a specific end-use application for the organic material. Moreover, substantial process efficiencies may be contributed to the filter press process by the beneficial use of heat values extracted by means of a heat exchanger or scrubber from the exhaust gas of a downstream thermal dryer for the filter cake with such extracted heat values used to heat the additional polar liquid added to the partially-decomposed organic material to produce the feed slurry admixture that is fed to the filter press. The polar liquid filtrate extracted from the slurry admixture during the squeeze cycle of the filter press may also be recycled to the feed slurry admixture with the heat content extracted from the dryer exhaust gas being used to warm that polar liquid filtrate. Furthermore, fine particles of the partially-decomposed organic material that is extracted by means of a scrubber from the exhaust gas exiting such downstream dryer may be recycled back to the production of the feed slurry admixture.

Under the present invention, the dryer, scrubber, and filter press collectively provide a synergistic effect to the overall partially-decomposed organic material demoisterizing process. The filter press reduces moisture in the filter cake, while also producing clean filtrate polar liquid (e.g., water) that is separated by and exits the filter press. The scrubber removes fine particles of the partially-decomposed organic material (e.g., peat) from the dryer exhaust gas, while also heating the filtrate water recycled from the filter press and acting as a heat exchanger. The dryer further reduces the moisture in the filter cake produced by the filter press, while contributing heat content to the filtrate water recycled to the slurry mixture to melt ice contained in the peat material that has been added to the slurry mixture. This is a highly efficient process by design that reduces the cost of producing a high-quality, low moisture filter cake.

The process and its equipment may be used to treat a variety of partially-decomposed organic material/polar liquid slurry admixtures, including high moisture peat containing water. Careful control of the squeeze cycle pressure and squeeze cycle duration in the filter press in the demoisturization process of the present invention produces peat filter cake having a moisture content as low as 60% wt, and 50% wt for a peat/Biochar filter cake. Such filter cake may be used in turn for a number of end-use applications, including peat as a combustion fuel, or for agricultural and industrial products, including bulk, pelletized, and chemically-treated peat products.

BRIEF DESCRIPTION OF THE DRAWINGS

In the accompanying drawings:

FIG. 25 represents an end view of the hollow filter frame/expansion plate of FIG. 24.

FIG. 26 represents an alternative, trapezoidal-shaped embodiment of the support tube 240 for the filter membranes inside the filter press.

DETAILED DESCRIPTION OF THE PREFERRED EMBODIMENT

Figure 1:
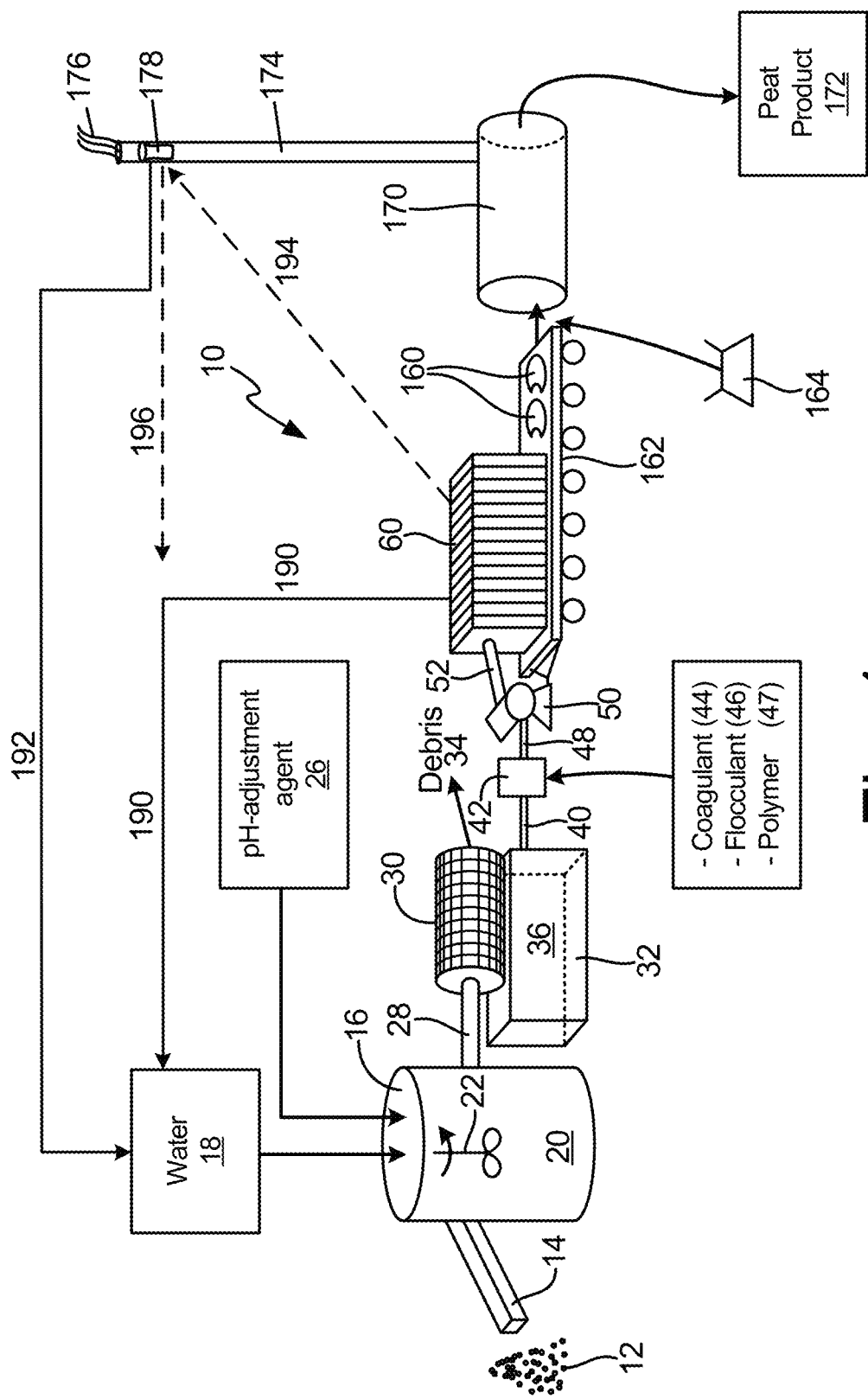
FIG. 1 represents a schematic view of an arrangement of equipment for carrying out the demoisturizing process of the present invention.

A process for the preparation of a concentrated filter cake from an admixture of partially-decomposed organic material and a polar liquid using a filter press without the input of thermal heat or superheated steam or other pressurized gas or liquid is provided by this invention. The admixture is mixed with an additional amount of the polar liquid to produce a feed slurry of the admixture having a moisture content of about 90-99% wt. A coagulant and a flocculant may be added to the resulting admixture slurry which is then introduced into the filter press having a plurality of filter plates with porous membranes secured along their outlet. Once filled with the admixture slurry, the pressure condition introduced inside the filter plate chambers is increased by a pressurized gas or liquid to force the polar liquid from the admixture slurry though apertures contained in the membrane, thereby leaving a filter cake of the partially-decomposed organic material having a moisture content that is lower than the moisture content of the initial partially-decomposed organic material feed.

The process and its equipment may be used to treat a variety of partially-decomposed organic material/polar liquid slurry admixtures, including high moisture peat containing water. The resulting peat filter cake having a moisture content, e.g., as low as about 60% wt for peat or about 50% wt for a peat/Biochar admixture may be used in turn for a number of end-use applications, including peat as a combustion fuel, or for agricultural and industrial products, including bulk, pelletized, and chemically-treated peat products.

For purposes of this invention, "partially-decomposed organic material" means any natural occurring, carbon-based, organic material that has partially decayed or decomposed over time in the ground, or is a plant or animal-based product that was subjected to a bacterial or thermal decomposition process, or is a fermented product not meant for human consumption. Such partially-decomposed organic material covers a variety of substances including, without limitation, peat, composted media (e.g., leaf compost media, grass compost media, composted manure, composted wood chips), crop byproduct residues (e.g., corn, soybean, oat, barley, or field legume plant parts other than the grain, including corn stover), distiller's grains, silage, lignite coal, charcoal, torrefied wood chips, partially-decomposed wood, Biochar, and combinations thereof. Compost media is any decayed organic matter. It does not include human or animal wastes, including manures or sewage sludge, or food products derived from a crop or animal that are meant for human consumption.

For purposes of this invention, "polar liquid" means liquids made up of covalently bonded molecules that each has a partial positive charge on one end and a partial negative charge on the other end. The electrons in the covalent bond are not shared equally between the atoms of different elements. Elements that have a higher electronegativity tend to pull the pair of electrons closer to themselves, thereby obtain a partial negative charge, while leaving the other atoms involved in the covalent bond with a partial positive charge. This results in a permanent dipole moment in the molecule, making it polar. Polar liquids can dissolve solids that are made of polar molecules, but cannot combine with a substance made of non-polar molecules. Examples of such polar liquids include without limitation water, alcohols (e.g., methanol, ethanol, propanol), ammonia ($NH_3$), water solutions containing inorganic compounds (e.g., salts), and industrial or food acids (e.g., acetic acid, formic acid, hydrochloric acid, sulfuric acid, and nitric acid).

The term "slurry" means a thin sloppy fluid mixture of solid particles with a liquid, including a polar liquid. Such a slurry may be found in its present form in nature like peat harvested from a bog or other peatland, or used as a convenient way of handling solids in bulk. Slurries behave in some ways like thick fluids, flowing under gravity, but are also capable of being pumped if not too thick.

For purposes of this invention, "slurry admixture" means a slurry comprising partially-decomposed organic material and polar liquid.

As used in this Application, "particles" include any three-dimensionally hardened shaped product formed from partially-decomposed organic material or other organic matter, including without limitation granules or pellets.

The term "about" means approximately or nearly, and in the context of a numerical value or range set forth herein ±2% of the numerical value or range recited or claimed.

While the process and product of the present Application is described using peat as the partially-decomposed organic material mixed with water in the slurry admixture, it should be understood that the invention is not limited to peat-based or water-based slurry admixtures.

Other partially-decomposed organic materials or other polar liquids may be used in the slurry admixture. Likewise, the end-use applications for the product of the present invention extend well beyond peat combustion fuels, and agricultural, industrial, and pelletized peat products, including sorption media or waste water treatment media.

The process for preparing the partially-decomposed organic material/polar liquid filter cake 10 of the present invention is depicted in FIG. 1 where peat is used as the starting partially-decomposed organic material 12. A variety of different types of peat may be used as the starting partially-decomposed organic material 12, including without limitation, reed sedge, sphagnum peat, high moor peat, transitional peat, low moor peat, hypnum, and peat moss. The peat material should be dug or vacuum harvested from the peatland or bog and used in its natural state without further decomposition process steps.

Peat 12 sourced from reed sedge will typically be drained and air dried in the field to achieve a moisture content of 75-86% wt over a period of nine months to four years before it is supplied to the manufacturer for an end-use application, compared with the natural 95-96% wt moisture level when it is extracted from the peatland or bog. By contrast, Sphagnum peat is typically vacuum harvested at a 35% wt moisture content from the peatland.

This invention allows peat at any moisture content to be introduced into the process and dewatered to 50% wt moisture. The peat does not have to be air or solar dried before being introduced into this process. The logistical reality of peat harvest, however, is that if peat is going to be hauled to a processing site by trucks, the moisture content of the peat is best below 90% wt. Peat with a moisture content of greater than 90% wt would result in significant logistical challenges.

The generally required moisture content for peat used in a number of different end-use applications is shown in Table 1.

TABLE 1

| Peat End-Use Applications | |
| --- | --- |
| End-Use | Moisture Content |
| Combustion fuel | <15% |
| Top soil, potting soil, mulch dressing | +60% |
| Granulation | 9-14% |

These requisite moisture levels are considerably below the 75-86% moisture content of the field-harvested, drained, and air-dried peat substrate used in these end-use application.

The peat particles 12 are fed by means of conveyor 14 to mixing tank 16. The peat is mixed with water 18 inside the mixing tank 16 to produce a slurry admixture 20 having a 90-99% wt moisture content. An important and surprising feature of the process of the present invention is to substantially increase the moisture level of the peat within the slurry admixture before substantially reducing the moisture content of the slurry admixture inside the filter press 60, as described below. Not only have filter presses not previously been used within the industry to treat partially-decomposed organic materials, let alone peat, but also the organic materials like sewage sludge and liquid manure are generally introduced to a filter press at their existing natural moisture level, or with only enough water to allow for slurry transport, so that the filter press needs to perform less work to remove liquids to achieve the desired moisture level reduction. It is counterintuitive to increase moisture levels within the partially-decomposed organic material 12 before removing polar liquid (e.g., water) inside the filter press in accordance with the present invention.

The peat 12 is generally left inside the mixture tank 16 for about 6-10 hours at an atmospheric or nearly atmospheric temperature of about 50-100° F. An agitator 22 rotates inside the mixing tank 16 to enhance the mixing of the peat into the water to produce the slurry admixture. In addition to producing the peat-water slurry admixture 20, the residence time of the peat spent inside the mixing tank 16 serves the additional purpose of melting ice that may be contained inside the field-harvested peat 12, especially during the winter months. The water 18 introduced into the mixing tank 16 may optionally be heated to a temperature above the 32° F. melting point of ice to enhance the melting of ice contained within the peat feed material.

Next, the peat-water slurry admixture 20 is adjusted for acidity to a pH range of about 6.4-7.0. Finely ground calcium carbonate ($CaCO_3$) 26 may be introduced into the mixing tank 16 into the slurry for this purpose. Such calcium carbonate pH adjustment agent should preferably have a particle size of about minus 325 mesh. It should be admixed on a weight basis of about 1-5%, preferably 2%, even more preferably 0.4%, with the peat material 12 to avoid plugging of the filter membranes 80 in the filter press 60 by the $CaCO_3$ neutralizing agent.

The substantially neutralized peat-water slurry admixture 20 is then introduced by means of conduit 28 to a rotating trommel screen drum 30 that is positioned above a slurry tank 32. Conduit 28 may be positioned at a decline from the mixing tank 16 so that the slurry flows to the trommel screen drum by means of gravity when a control mechanism like a valve is opened to permit the slurry to flow out of an outlet in the tank. Otherwise, mechanical means like a pump (not shown) may be interposed within conduit 28 to withdraw the slurry from the mixing tank.

The trommel screen drum 30 has a diameter of about five feet and a length of about 25 feet. Its sides contain a plurality of apertures that are about ¼ inch-about 1 inch in diameter, preferably about ⅜ inch in diameter.

As the slurry admixture flows into trommel screen drum 30, it is gently rotated at about 1-10 rpm, preferably about 5 rpm. The trommel screen drum may be positioned at a slight decline from conduit 28 so that the slurry flows into and through the drum. As the drum rotates, sticks, stones, rocks, metal, and other debris contained within the field-harvested peat material 12 will be separated from the slurry admixture and moved to the other end of the drum. This debris 34 may be discharged through an outlet in the drum. Meanwhile, the slurry admixture 36 now cleaned of debris 34 falls into slurry tank 32. A trommel rotating drum 30 suitable for purposes of this invention may be sourced from Powerscreen Ireland Ltd. of Mountmellick, County Laois, Ireland.

The cleaned slurry admixture 36 is moved from the slurry tank 32 by means of mechanical pump 50 to mechanical filter press 60. Pump 50 is a centrifugal pump that pressurizes the slurry to 150 psi. Alternatively, two mechanical pumps, each producing a pressure condition of 75 psi, may be used in tandem to bring the slurry admixture 36 to this 150 psi condition so that it flows to the filter press 60.

Mixing junction 42 may be interposed between conduit 40 that withdraws the slurry admixture 36 from slurry tank 32, and conduit 48 that delivers the slurry admixture to pump 50. This mixing junction 42 may represent an in-line chemical injection pump useful for introducing chemical additives into the slurry admixture. Such chemical additives may include a coagulant 44. Colloidal suspensions will typically occur within the slurry admixture 36. In this colloidal suspension, peat particles will settle very slowly or not at all because the colloidal particles carry negative surface electrical charges that mutually repel each other. Coagulants often represent metallic salts carrying a positive charge that are added to the slurry to create positively charged ions to overcome this repulsive charge, and "destabilize" the suspensions. Once these repulsive negative charges on the peat particles surface have been neutralized, van der Walls forces will cause the peat particles to cling together and agglomerate within the slurry admixture to form micro flocs. For purposes of this invention, the coagulant 44 preferably constitutes a cationic coagulant with 1-20 percent organics such as polyamine for slurry mixtures containing partially-decomposed organic material, with a preferred range of 5-10% wt within the slurry. NS13682 coagulant made by Neo Solutions, Inc. of Beaver, Pennsylvania provides a preferred example of the coagulant.

A flocculant 46 may also be added to the slurry admixture 36 at mixing junction 42. Flocculants represent polymers that are added to the slurry to clump the small, destabilized peat particles together into larger peat aggregates that can more easily be separated from the water within the slurry admixture by the filter press 60. Flocculation is a physical process that does not involve neutralization of electrical charges. For purposes of the demoisturizing process 10, an aluminum-based, low-molecular weight, low-charge anionic flocculant with a charge density of 0-30% is added to the slurry admixture 36 containing partially-decomposed organic material within a preferred 10-15% wt range. Alternatively, a flocculant with a molecular weight of 7-20 million may be used within a preferred 10-15 million range. The NS6151 flocculant made by Neo Solutions provides an example of a preferred flocculant.

When the partially-decomposed organic material in the slurry mixture comprises peat, a polymer 47 may be introduced at the mixing junction 42 to help the water migrate from the peat matrix during the squeeze cycle 152 in filter press 60 described below. NS9010 polymer made by Neo Solutions, Inc. provides a preferred example of this polymer 47.

Moreover, it has been found that this NS9010 polymer also exhibits coagulant and flocculant properties for slurry mixtures containing peat. Thus, when the partially-decomposed organic material comprises peat, the separate coagulant 44 and flocculant 46 may be dispensed with in favor of the NS9010 agent that functions as a polymer, coagulant, and flocculant.

The slurry admixture 36 optionally containing the coagulant agent 44, flocculant agent 46, and polymer agent 47 is transported by means of pump 50 through conduit 52 into filter press 60. A filter press represents a tool used in solid/liquid separation processes employing the principle of pressure drive provided by a slurry pump. It generally comprises a series of plates that create chambers into which the slurry admixture is introduced. As the chambers are filled, sludge formation will usually increase the pressure condition within the chambers. Compressed air or water is then introduced into the expansion plates to increase the chamber pressure to force the slurry through filter cloths or membranes with the liquid passing through the filter cloth, leaving the solid behind in the chamber to form a filter cake.

Figure 2:
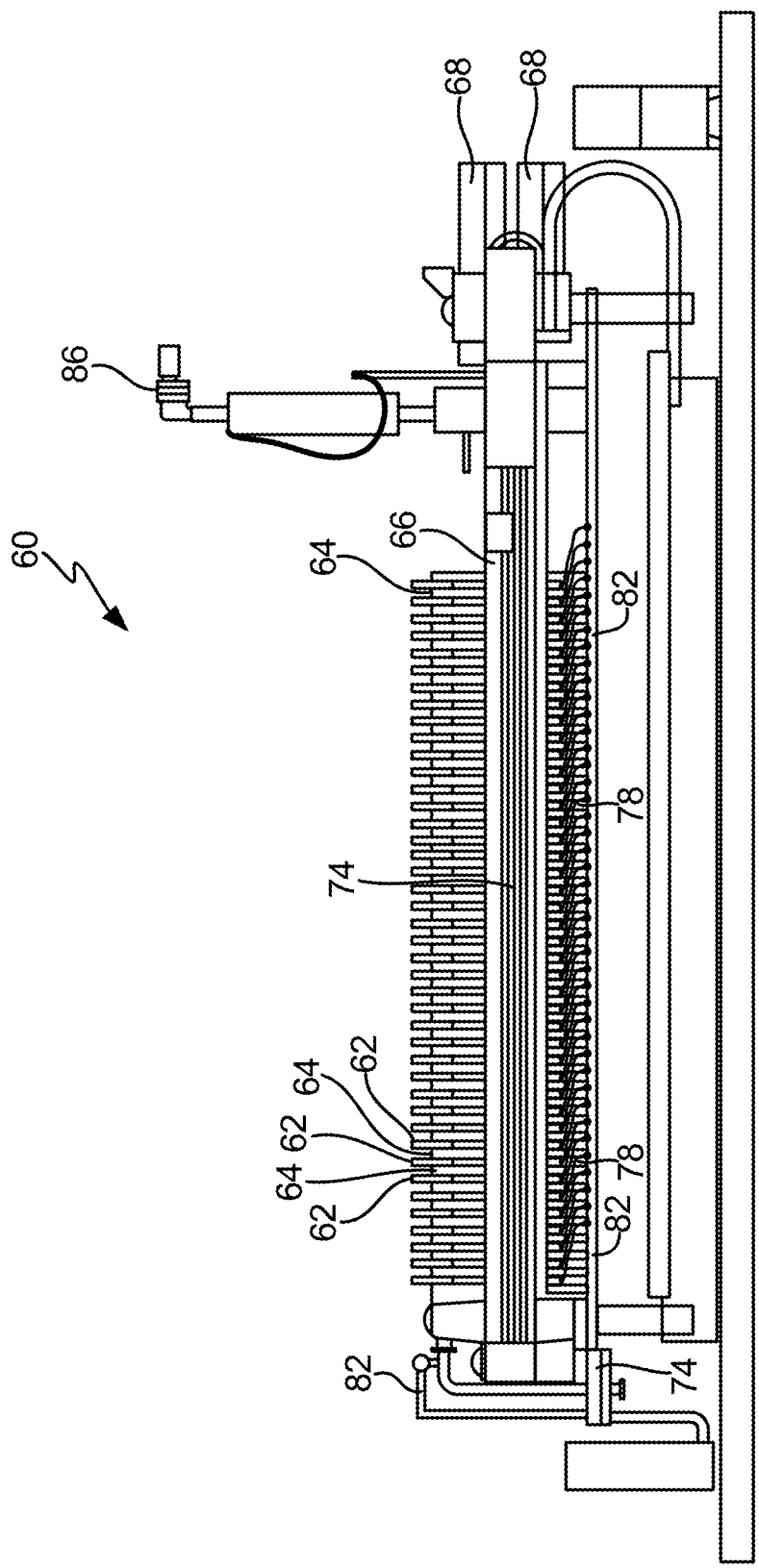
FIG. 2 represents a side view of a filter press used within the demoisturizing process.
Figure 3:
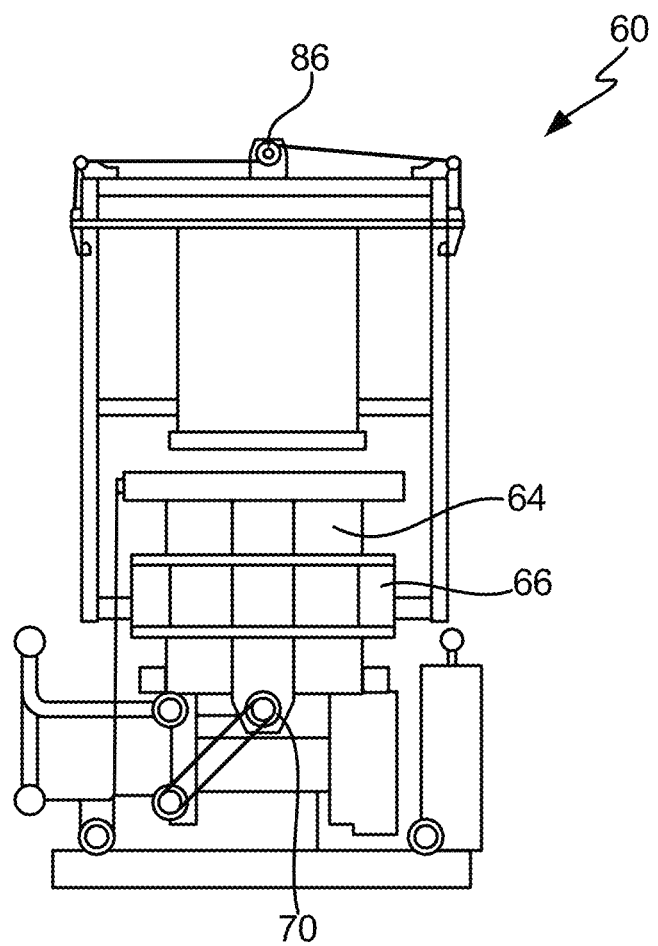
FIG. 3 represents a right end view of the filter press shown in FIG. 2.

A suitable filter press 60 for purposes of dewatering process 10 may be sourced from Flow Press USA of Yuba City, California. As shown in FIGS. 2-3, it represents a plate and frame filter type of press. It comprises a series of solid filter plates 62 and hollow filter frames 64 (see FIGS. 4-5 and 10-11) assembled alternately along a pair of rails 66. Hydraulic rams 68 move these solid filter plates 62 and hollow filter frames 64 away from each other and towards each other along the rails 66 to open and close the filter press 60, respectively. The slurry admixture 36 is delivered through a series of co-axial and cooperating through holes 70 in the solid filter plates 62 and hollow filter frames 64 to fill a chamber 72 associated with each solid filter plate 62 (see FIGS. 13-14). The aligned solid filter plates 62 and hollow filter frames 64 cooperate to produce a "conduit" 74 that runs along the central region of the filter press 60 to deliver the slurry admixture into the fill chambers 72. A series of hoses 78 are connected to the hollow filter frames 64 to deliver a source of pressurized air, gas, or water ("fluidizing gas") to the interior of the hollow filter frames. This fluidizing gas acts indirectly to force the slurry admixture 36 contained inside the fill chambers 72 through the filter membranes 80 to produce the solid-liquid separation. The separated water flows into discharge pipes 82. Power washer 86 mounted to the top of the filter press 60 may be used by an operator to clean out the interior fill chambers 72 and plates 62 and 64 of the filter press.

Figure 4:
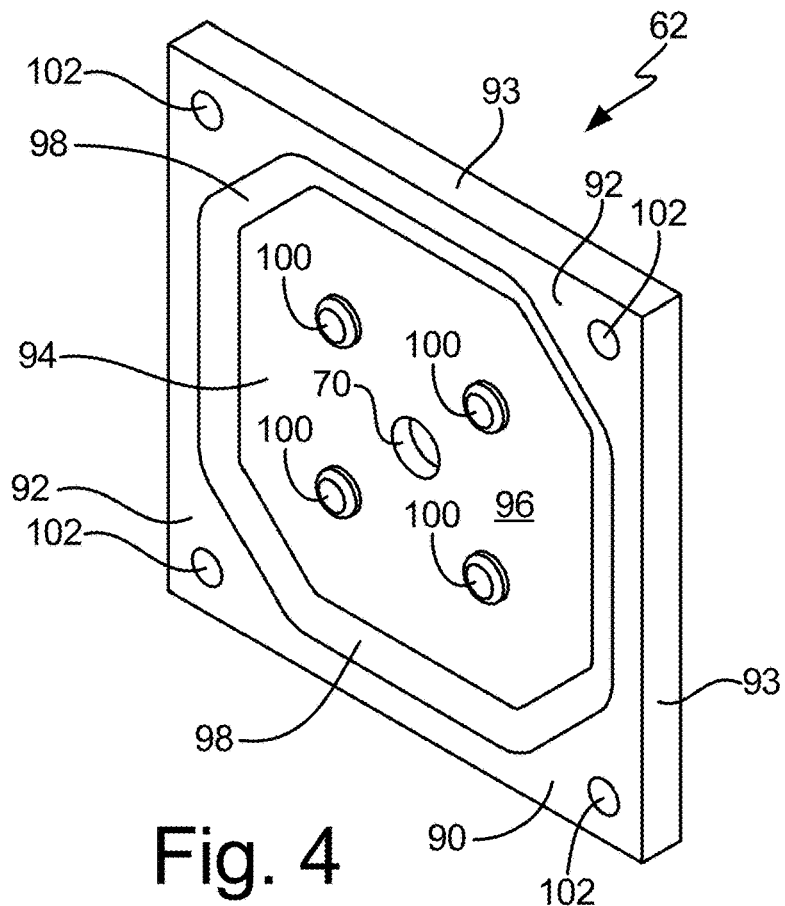
FIG. 4 represents a perspective view of the solid filter plate/cavity plate used within the filter press of FIG. 2.
Figure 5:
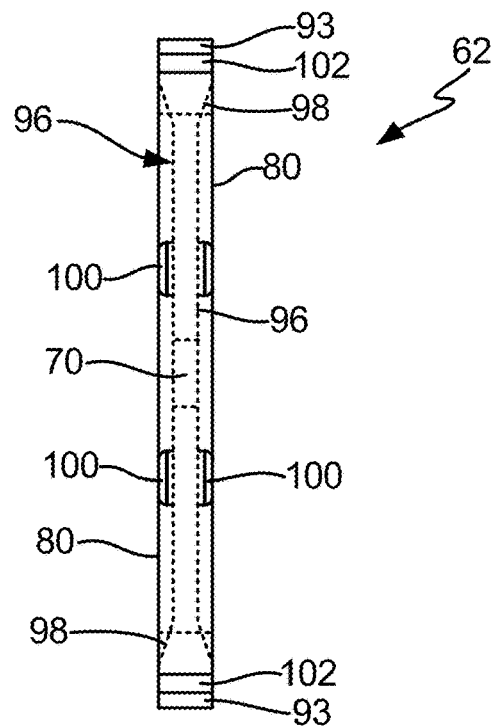
FIG. 5 represents an end view of the solid filter plate/cavity plate of FIG. 4.

The solid filter plate 62, also called a "cavity plate," is shown more clearly in FIGS. 4-5. It comprises a panel 90 having a flat outer perimeter surface 92 on both sides and depressed cavity regions 94 in the central portions of both sides of the panel defined by flat wall 96 and slanted side walls 98. Four solid core braces 100 extend through the interior of the plate, and add structural stability to the plate. A plurality of pegs (not shown) extend outwardly from flat wall 96 into the cavity regions 94. Inlet through hole 70 passes through the center of the panel 90. A series of outlet through holes 102 extend through the corners of the perimeter wall 92 of the panel.

Figure 6:
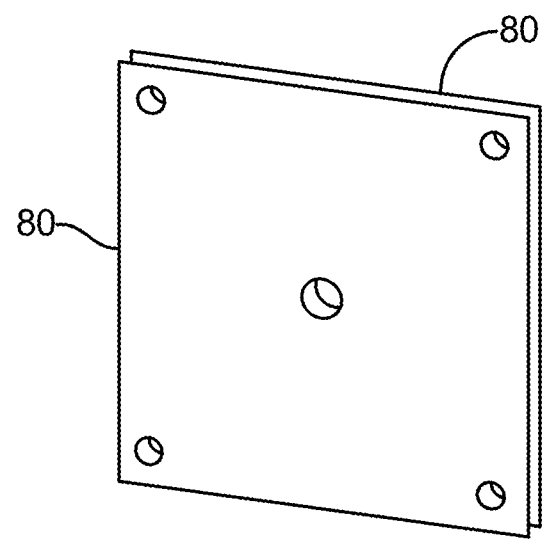
FIG. 6 represents a perspective view of the filtration membrane used within the filter press of FIG. 2.
Figure 7:
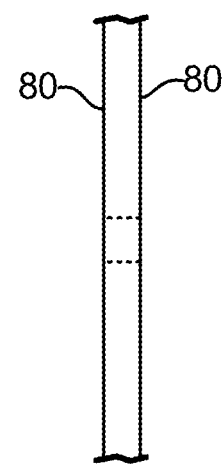
FIG. 7 represents an end view of the filtration membrane of FIG. 6.
Figure 8:
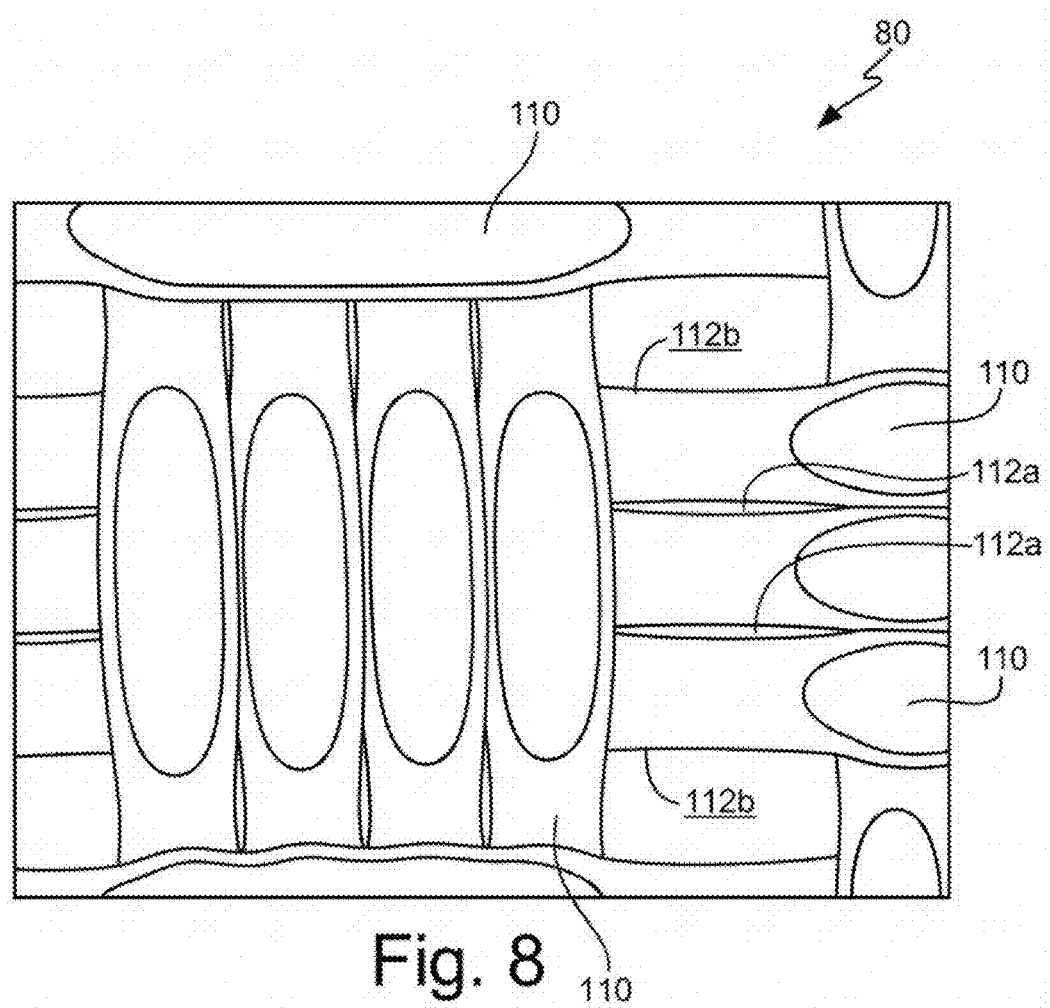
FIG. 8 represents a photomicrograph of a portion of the filtration membrane of FIG. 6 containing orderly fibers.
Figure 9:
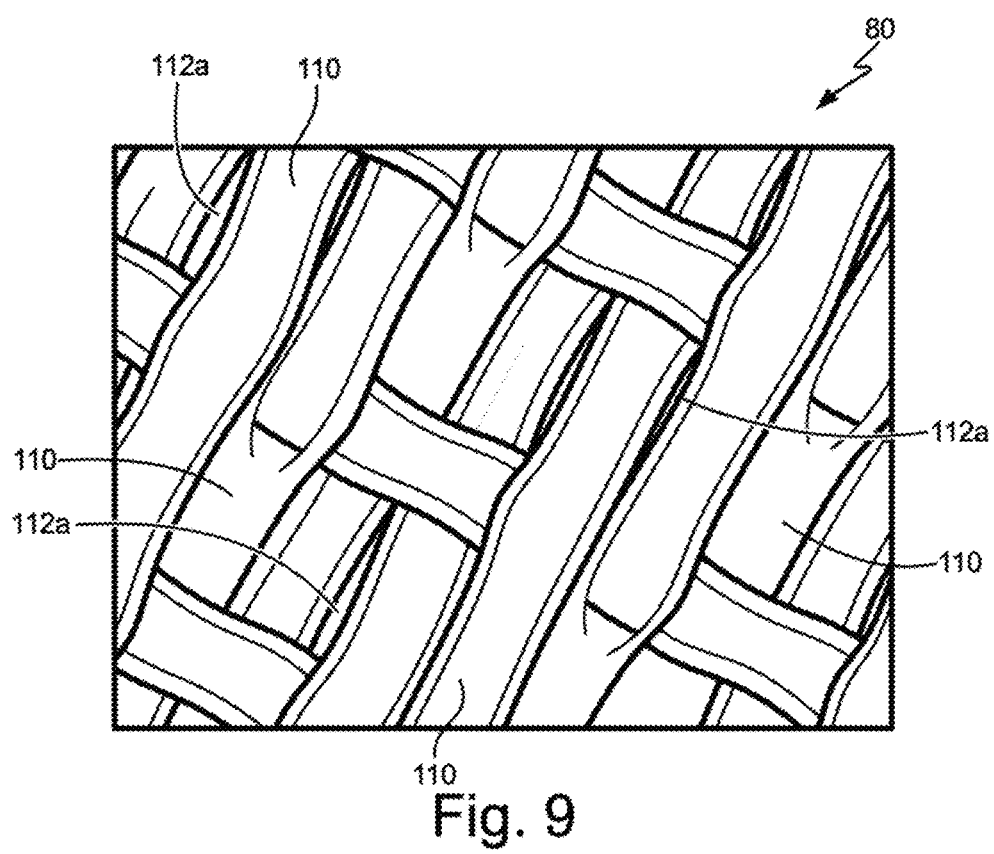
FIG. 9 represents a photomicrograph of a portion of the filtration membrane of FIG. 6 containing random-oriented fibers.

The filter membrane 80 is shown more clearly in FIG. 6. It comprises a woven substrate comprising orderly or random-oriented fibers 110 with microscopic apertures 112 formed between the crossed fibers. Membrane 80 may be made from a variety of materials that are capable of being woven into a porous membrane, yet durable enough to withstand pressurized flow of the slurry admixture along the order of 225 psi or greater. Polypropylene, polyester, chinlon, chinlon/polyester mix, nylon, vinylon, or pure cotton may be used, although nylon is preferred. Porous membranes are rated by manufacturers in terms of flow rate of an air stream at a pressure equal to about 0.5 inches of water column passing through the membrane's apertures. The preferred flow rate for the membrane 80 for purposes of the demoisturizing process 10 is about 60-1,000 cfm (ft$^3$/min). FIG. 8 represents a photomicrograph of such a filter membrane 80 comprising the fibers 110 woven in an orderly manner with the apertures 112 formed between the crossed fibers. The photomicrograph was taken at a 125× magnification level using an AmScope MD300 digital dissecting scope. The apertures comprise smaller gaps 112*a* and larger gaps 112*b*. FIG. 9 represents a photomicrograph of such a filter membrane 80 comprising the fibers 110 woven in a more random-oriented manner in which some of the fibers overlap each other. The apertures 112*a* formed between the crossed or overlapping fibers comprise smaller gaps 112*a*.

It is important to balance the capabilities of the filter membrane material to pass water or other polar liquid through the apertures 112 to achieve the desired liquid/solid separation, while also exhibiting sufficient abrasion-resistance properties to withstand peat and other particles contained inside the slurry admixture 36 moving under pressure to abrade or tear the filter membrane material. This is particularly important if the slurry admixture contains a combination of peat and Biochar. Nylon has been found to provide this balance of properties with a 321× fabric product comprising Monodur™ woven mesh made from nylon synthetic monofilaments with a square mesh and sourced from Clear Edge Filtration Group of Minneapolis, Minnesota being preferred.

The membrane 80 is sized to fit the dimensions of the cavity plate 62. Membranes are secured to both sides of the cavity plate. The membrane's perimeter is secured to the outer perimeter wall 92 of the cavity plate, or else the side walls 93 of the panel 90. The membrane 80 is flexible enough that it will roughly adhere to the profile of the cavity region 94 of the cavity plate. The pegs (not shown) separate the membrane from the central flat wall 96 of the panel 90, thereby creating a space 118 for water to flow between the membrane and plate wall toward the discharge.

Figure 10:
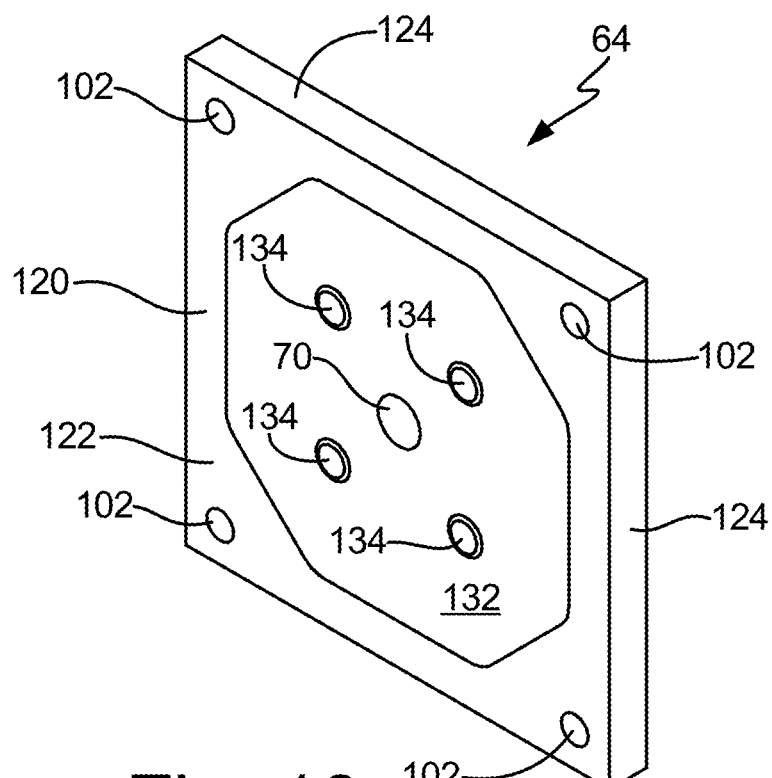
FIG. 10 represents a perspective view of the hollow filter frame/expansion plate used with the filter press of FIG. 2.
Figure 11:
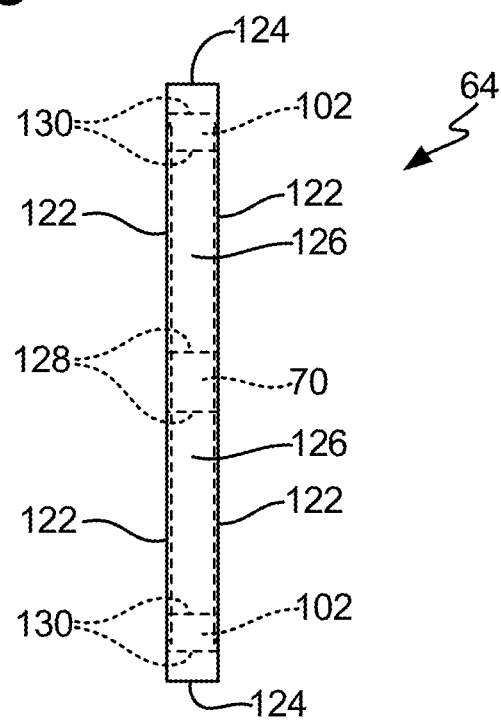
FIG. 11 represents an end view of the hollow filter frame/expansion plate of FIG. 7.

The hollow filter frames 64, also called an "expandable plate," are shown more clearly in FIGS. 10-11. It comprises a frame 120 having outer walls 122 and end walls 124 defining a hollow minimally concave interior region 126 inside the frame. Annular wall 128 connected to both outer walls 122 in the central region of the plate defines inlet through hole 70. Similar annular walls 130 connected to both outer walls 122 near the four corners of the plate define the outlet through holes 102. A central region 132 of the two opposing outer walls 122 is made from a polypropylene material that is flexible under pressure. Four solid core braces 134 extend through the interior of the expandable plate, and add structural stability to the plate. A plurality of pegs (not shown) positioned along the central wall region 132 extend outwardly from both sides of the expandable plate 64, creating a space 138 for water to flow between the membrane and the plate wall toward the discharge. The outer profile of the expandable plate 64 is considerably flatter than the "wishbone" recessed profile of the cavity plate 62. When the filter press 60 is closed, and the cavity plates 62 and expansion plates 64 are compressed together, the slurry admixture 36 is pumped into an interior chamber 72 as defined by the space between the adjacent cavity plate membrane and the expandable plate membrane.

A similar membrane 80 is sized to fit the dimensions of the expandable plate 64. Membranes are secured to both sides of the expandable plate. The membrane's perimeter is secured to the outer perimeter wall 122 of the expandable plate, or else the side walls 124 of the frame 120. The membrane 80 is flexible enough that it will roughly adhere to the profile of the slightly depressed region 132 of the expandable plate. The pegs (not shown) separate the membrane from the central flat wall 132 of the frame 120, thereby creating a space 138 for water to flow between the membrane and plate wall toward the discharge.

Figure 12:
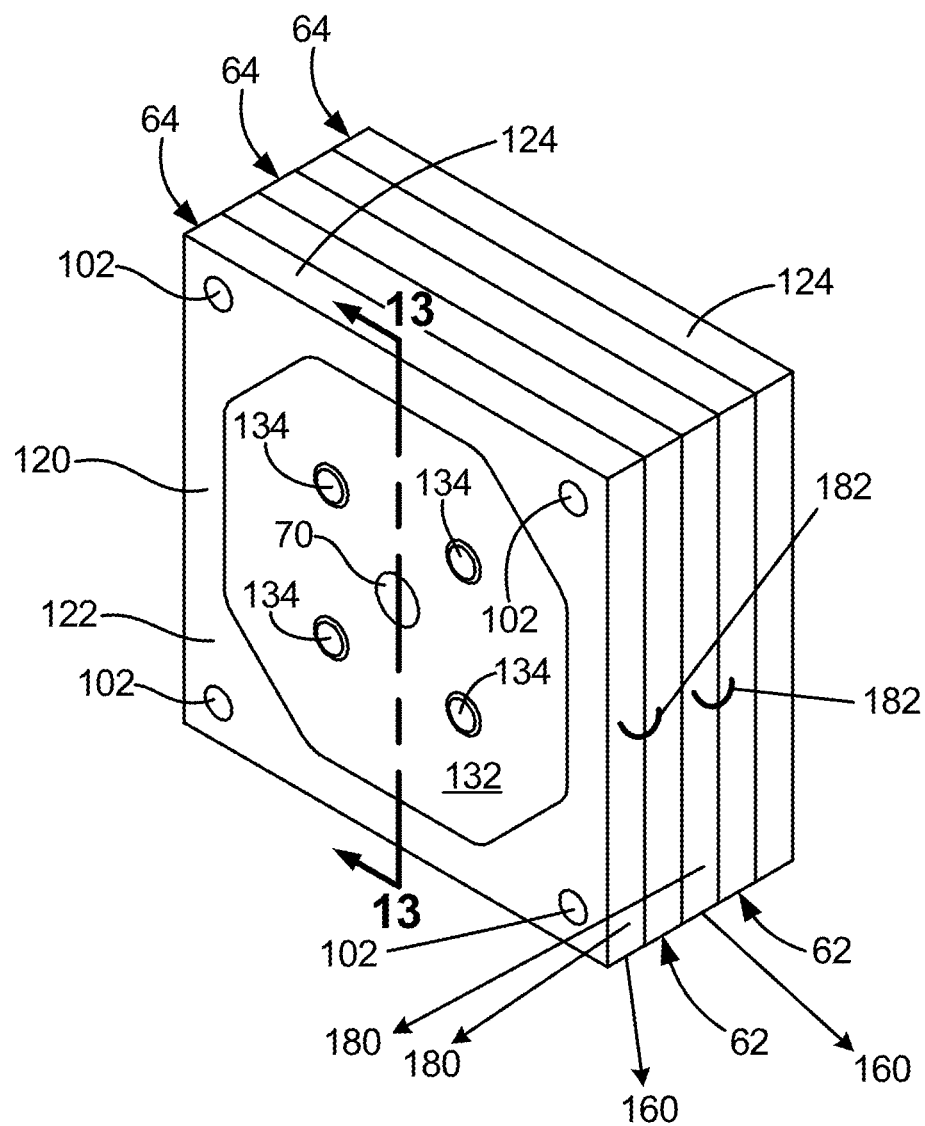
FIG. 12 represents a perspective view of a plurality of alternating solid filter plate/cavity plates and hollow filter frame/expansion plates used with the filter press of FIG. 2, as depicted in their "closed" position
Figure 13:
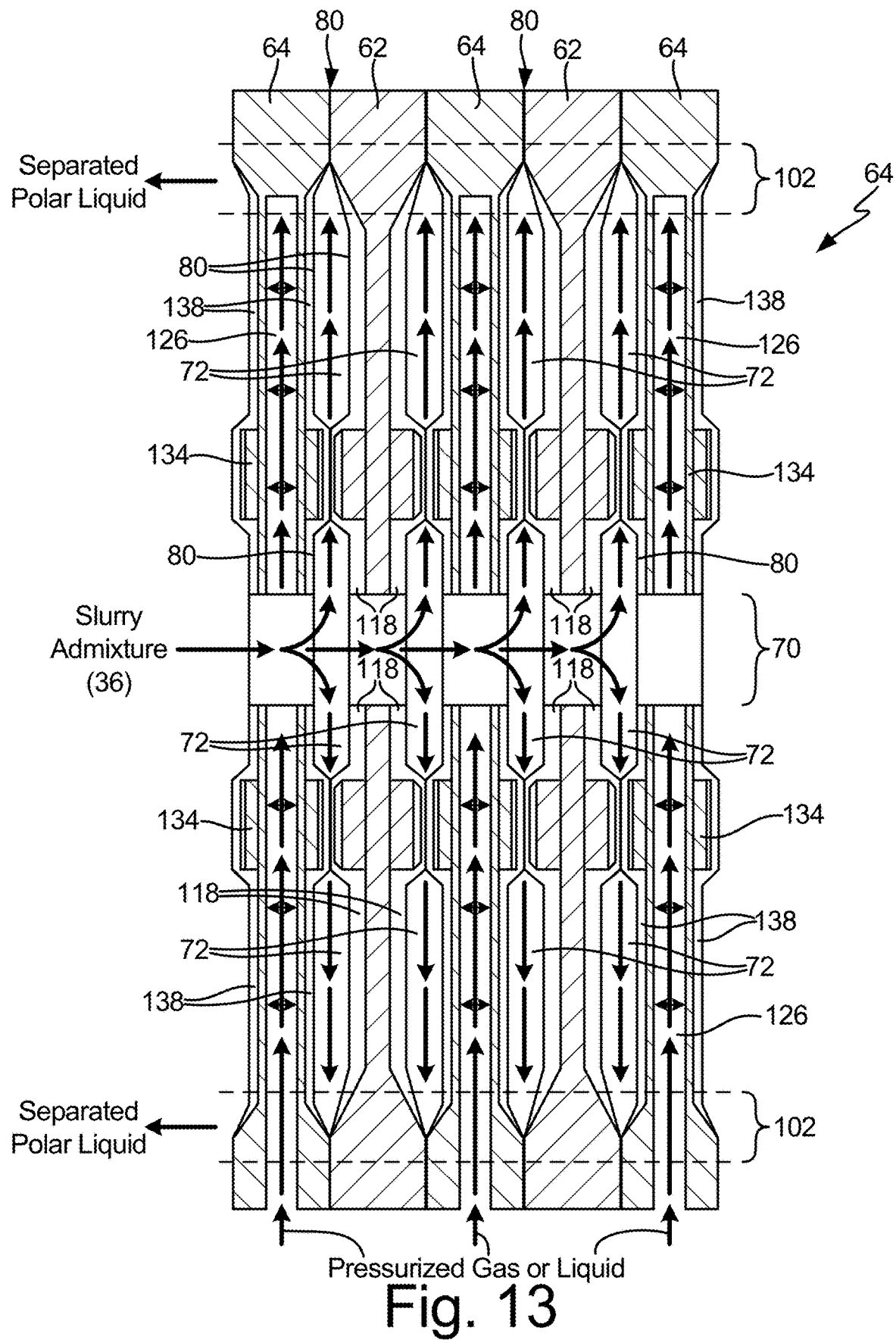
FIG. 13 represents a cross-sectional view of the plurality of alternating solid filter plate/cavity plates and hollow filter frame/expansion plates of FIG. 12.
Figure 14:
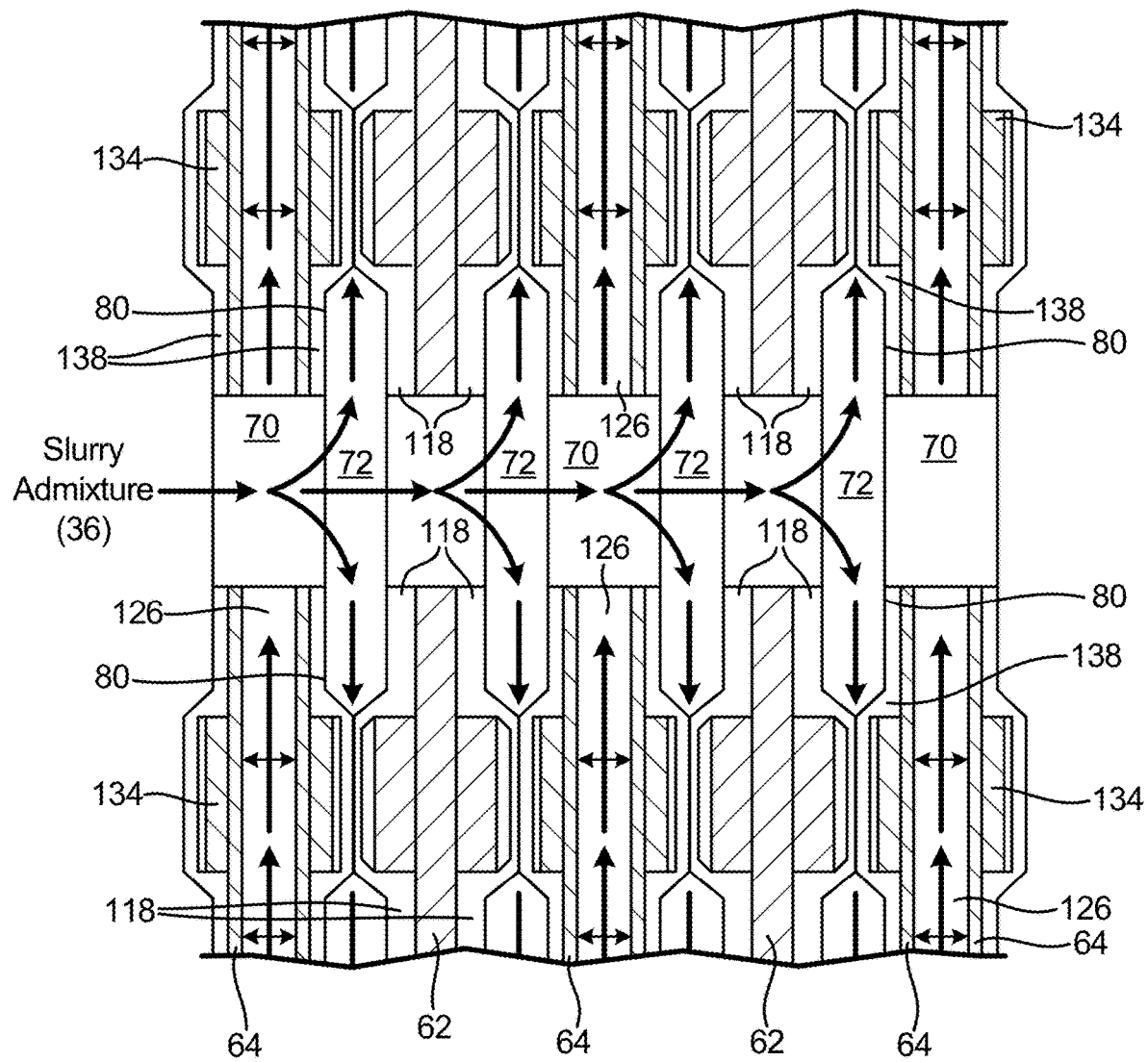
FIG. 14 represents a partial cut-away view of the cross-sectional view of the plurality of alternating solid filter plate/cavity plates and hollow filter frame/expansion plates of FIG. 13 in an enlarged, exaggerated state for ease of understanding.

FIG. 12 depicts a plurality of alternating cavity plates 62 and expandable plates 64 aligned in their closed position, as if they are along the rams 66 of the filter press 60. FIG. 13 is a cross-sectional view of FIG. 12 depicting the alternating array of cavity plates 62 and expandable plates 64 and their associated membranes 80, and showing the associated slurry admixture fill chambers, separated polar liquid fill chambers, and flows the of slurry admixture and discharged separated polar liquid inside the filter press. FIG. 14 represents an enlarged partial cut-away view of FIG. 13.

The filter press 60 operates on a batch process. Once the cavity plates and expandable plates are moved to their closed position, a fill cycle 150 commences. During this fill cycle 150, the slurry admixture 36 is transported under a pressure of about 120-200 psi, preferably about 155 psi, produced by centrifugal, piston, or diaphragm pump 50 through the aligned central inlet ports 70 extending through the cavity plates 62 and expandable plates 64, and into the plurality of fill chambers 72 defined between the cavity plates' membrane 80 and the expandable plates' membrane 80. This fill cycle lasts about 15-45 minutes in duration. Where the slurry admixture comprises a mixture of peat and water, the fill cycle lasts about 15-25 minutes, preferably about 20 minutes.

Once the fill cycle 150 ends, the squeeze cycle 152 commences. During this squeeze cycle, the fluidizing gas is injected at a pressure of about 100-400 psi, preferably below about 75 psi into the interior chamber 126 of the hollow expandable plates 64. This squeeze cycle 152 lasts for about 15-60 minutes in duration. Where the slurry admixture comprises a mixture of peat and water, the squeeze cycle lasts about 15-35 minutes, preferably about 25 minutes.

The pressure-creating gas or liquid contained inside the hollow interior chamber 126 of the expandable plates 64 will press outwardly upon the central region walls 132 of the expandable plates 64 to push them and the membranes 80 into the slurry fill chambers 72 containing the slurry admixture 36. By reducing the volume of the slurry fill chamber 72, the liquid from the slurry admixture is squeezed through the apertures contained in the membranes 80 positioned along the cavity plate 62 and expandable plate 64 on each side of the slurry fill chamber 72.

It has been found that gradually increasing the pressure condition contained inside the fluidizing gas fill chamber 126 over the course of the squeeze cycle enables the water in the slurry admixture 36 to flow through the internal passages in the peat material to assist with the solid-liquid separation process. If the fluidizing pressure is increased too quickly during the squeeze cycle, then the fibers contained within the peat material will align themselves to shut off these microscopic passageways that allow the water to flow out of the peat material. This will result in plugging the apertures in the filter membrane material that can significantly impede the liquid/solid separation of the slurry admixture 36. Once this occurs, the filter press will need to be shut down and the filter plates 62 and expandable plates 64 opened to provide access to the filter membranes 80 so that they can be manually cleaned to remove the peat material that is plugging the apertures.

Water flows through the apertures 112 in the membranes 80 into the interior fill space 118 between the cavity plate wall and its associated membrane 80 (defined by the raised pegs), and the interior fill space 138 between the expandable plate wall and its associated membrane 80 (again defined by the raised pegs), and from there through the aligned discharge through holes 102 along the four corners of the cavity plates 62 and expandable plates 64 for discharge. The peat material within the slurry aggregate 36 remains inside the fill chamber 72 as a filter cake 160, now having its moisture content reduced from the about 90-99% wt level of the slurry aggregate to as low as about 50% wt. More specifically, this desired moisture reduction level in the filter cake 160 should be about 60-85% wt for a peat-only product, preferably about 68% wt. For a peat/Biochar mixed product, this desired level of moisture reduction should be about 50-80% wt, preferably about 70% wt.

The level of the polar liquid (in this case water) contained in the filter cake 160 cannot be reduced below about 50% wt due to the strong negative charges on the surface of the partially-decomposed organic material (in this case peat) that attract the positive charged ends of the polar liquid molecules. But, this still represents a very significant reduction in the polar liquid from the slurry admixture, particularly considering that the thermal heat or steam that constitutes a critical feature of many prior art dewatering processes has not been used in the demoisturizing process 10 of this invention. Moreover, the demoisturizing process 10 of this invention is capable of producing clear water having less than about 5 ppm suspended solids.

Next, a "core blow" cycle 154 is commenced to use pressurized air or other gas from a compressor at up to about 200 psi through the aligned central inlet through holes 70 along the closed cavity plates 62 and expandable plates 64 of the filter press 60 to clear any remaining slurry admixture 36 from these through holes and the virtual conduit that they form. This core blow cycle 154 should last about 45 seconds-5 minutes for a peat or peat/Biochar slurry mixture 36, preferably about 2 minutes.

Once the core blow cycle 154 ends, a "cake blow" cycle 156 is commenced to direct pressurized air or other gas at about 200 psi through the aligned outlet through holes 102 along the closed cavity plates 62 and expandable plates 64 of the filter press 60 to clear away any remaining discharge water from these through holes and the virtual conduits that they create. This cake blow cycle 156 should last about 1-10 minutes, preferably about 2 minutes, in duration.

Finally, the hydraulic rams 68 are operated to move the cavity plates 62 and expandable plates 64 away from each other along the rails 66 to open the filter press 60. This is done typically by means of a "rabbit" 180 that engages each of the plates sequentially to pull it (e.g., to the left) to separate it from the adjacent plate to the right. Now the filter cake 160 containing the substantially-reduced moisture peat material falls by means of gravity from the opened fill chambers 72 in the filter press 60 out and onto conveyor 162. It may be fed to a hammer mill 164 that breaks the filter cake 160 into finer peat particles of reduced moisture of about ⅜-inch targeted size. This hammer mill process will also restore the dewatered peat to its fibrous condition.

However, in a preferred embodiment of the filter press 60, a chain 182 has its ends attached to the adjacent expansion plate 64 and filter plate 62, respectively, as shown in FIG. 12. In this embodiment, each rabbit 180 only needs to engage an expansion plate 64 and pull it to the left with the associated chain 182 likewise pulling the associated filter plate 62 in the pair of plates to the left after they have been opened with respect to each other to allow the filter cake 160 to drop out by means of gravity on to conveyor 162. This arrangement of chains 182 thereby cuts the discharge time by half compared with the embodiment where a separate rabbit 180 must engage each plate.

Many peat end use applications require a moisture level below 50%. Thus, the peat material exiting the hammer mill 164 may be fed to a supplemental dewatering process such as a dryer 170. A horizontal rotary dryer may be used with inlet dryer gas at 1800° F. providing the supplemental heated air drying medium. Alternatively, a vertical dryer that drops the partially-decomposed organic material from the top of the dryer down through the heated interior region may be employed. But vertical dryers do not work as well for peat particles which have a low density, because the particles become entrained in the dryer gas. The heated air drying medium 176 is vented to the atmosphere from stack 174 attached to horizontal or vertical dryer 170 (See FIG. 1). Scrubber 178 contained inside stack 174 removes fine particulate peat or other partially-decomposed organic material from the discharged heated airstream to protect the environment.

Other mechanical dewatering processes like a centrifuge, vacuum dryer, belt press, roller press, or wire press may alternatively be used as the supplemental dewatering process, particularly for partially-decomposed organic materials other than peat used as the starting material. The horizontal rotary dryer 170 can reduce the final peat product 172 to about 38% moisture.

Use of dryer 170 to further reduce the moisture level in filter cake 160, as described above, provides additional benefits to the partially-decomposed organic material demoisterizing process 10 of the present invention. As shown in FIG. 1, the heat content of dryer exhaust air stream 176 vented from dryer stack 174 may be extracted by means, e.g., of a heat exchanger located inside the stack. This extracted dryer exhaust heat 192 may then be transported to water supply 18 to heat the water temperature to above 32° F. More specifically, this recycled dryer exhaust heat stream at about 160° F.±40° F. will heat the water supply 18 sufficiently to produce a slurry mixture 20 inside mixing tank 16 also containing the partially-decomposed organic feed material 12 like peat to produce a slurry admixture at about 40-120° F., preferably about 110° F. This heated slurry mixture melts any frozen peat particles and any ice particles contained therein to produce good admixture of the peat and water components. In northern geographic regions, peat harvested from bogs during winter months is frequently frozen and in need of external heating prior to the admixture step. But use of the recycled dryer air stream 192 to heat the water supply 18 or the contents of the slurry admixture 20 directly saves the need for a 27iquid27e heater and the fuel needed for such a heater. In a system of the present invention, 1.8 million BTU/hour can be successfully scavenged from the heated dryer airstream 176, which represents a significant cost savings for the demoisturizing process 10.

Even more advantageous, the scrubber 178 contained inside dryer exhaust stack 174 may comprise a Venturi-type scrubber. In addition to removing fine particulates of the partially-decomposed organic material like peat from the dyer exhaust stream 176, such a Venturi-type scrubber also will act like a heat exchanger. Clean filtrate polar liquid like water 190 discharged from the filter press during the squeeze cycle 152 and the subsequent core blow cycle 154 and cake blow cycle 156 that would otherwise be recycled to the water supply 18 (see FIG. 1) may instead be transported to scrubber 178 located inside dryer exhaust stack 174. This filtrate water stream 194 will absorb the heat content of the dryer exhaust stream passing through the scrubber 178. The resulting heated filtrate polar liquid stream 196 is then transported from scrubber 178 to water supply 18 or slurry tank 16. As an additional bonus, recycled filtrate polar liquid stream 194 may absorb the fine particulate dust separated from the dryer exhaust gas 196 by scrubber 178 directly to slurry tank 16 or conduit 52 entering filter press 60 to increase the partially-decomposed organic material (e.g., peat) content of the slurry admixture to be treated by the filter press. This improves the efficiency of the demoisturizing process produced by the filter press 60.

Figure 15:
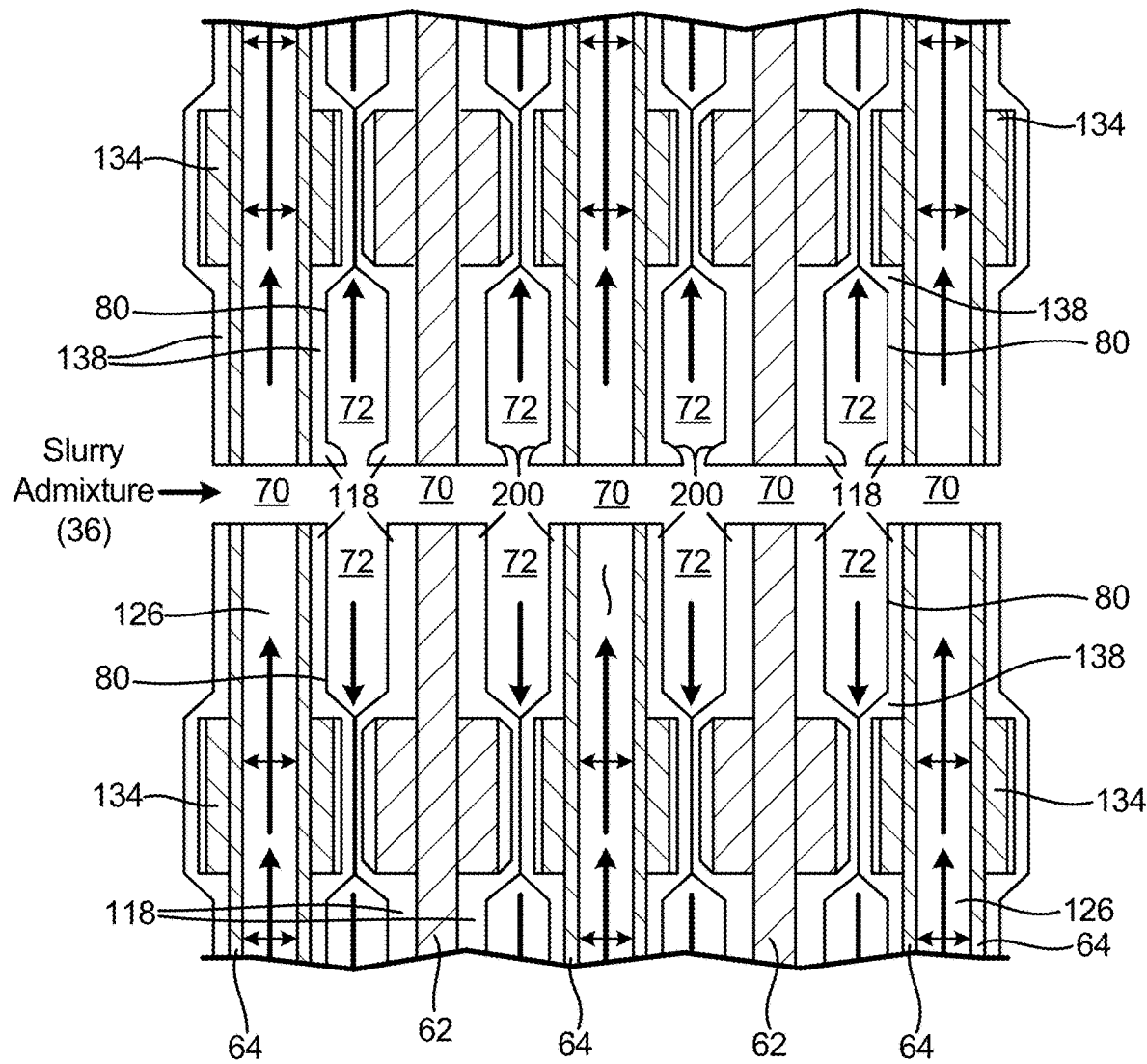
FIG. 15 represents the partial cut-away view of FIG. 14 in which the bottom edges of the filter membranes 80 are shown to droop from the fill chambers 72 into the central core passageway 70.

FIG. 15 shows the arrangement of adjacent filter plates 62 and expansion plates 64 with the membrane filters 80 spanning the cavity regions 94 of the filter plates 62 and concave interior regions 126 of the expansion plates 64 to collectively define central core passage 70 through which the slurry admixture 36 passes to enter fill chambers 72 defined between the filter plates and their adjacent filter membranes 80. As discussed above, the material of the filter membranes 80 must be flexible enough to reduce the volumes of fill chambers 72 when the central region walls 172 of expansion plates 64 are outwardly deflected by the pressurized gas or liquid during the squeeze cycle 152 to force the polar liquid within the slurry admixture contained inside fill chambers 72 through filter membranes 80 into chambers 118 to achieve the liquid/solid separation, while containing the necessary apertures 112 to provide passages for the polar liquid to pass therethrough. At the same time, however, such a flexible fabric filled with apertures will also be subject to abrasion as particles inside the slurry admixture 36 strike the fabric.

This phenomenon is compounded by the presence of harder particles like Biochar contained in a peat/Biochar slurry admixture. Moreover, gravity tends to cause the upper portion of filter membranes 80 to droop into central core passage 70 and even form bulges 200 which acts to narrow the inlet passage for the slurry admixture 36 into fill chambers 72, as shown in FIG. 15. This is more of a problem for the portion of the filter membrane above central core passage 70 then for the portion below the central core passage, since gravity will tend to pull the lower portion of the filter membrane 80 tight. Such abrasion causes the filter membranes to wear out quickly and need to be replaced.

Such abrasion is also worsened during the core blow cycle 154 when the fluidizing gas (e.g., compressed air) is introduced into central core passage 70 at speeds of about 70 mph to push residual moisture contained in the fill chambers 72 after the squeeze cycle 152 through the filter membrane 80 and therefore out of the fill chambers to further reduce the moisture content of filter cake 160.

Figure 16:
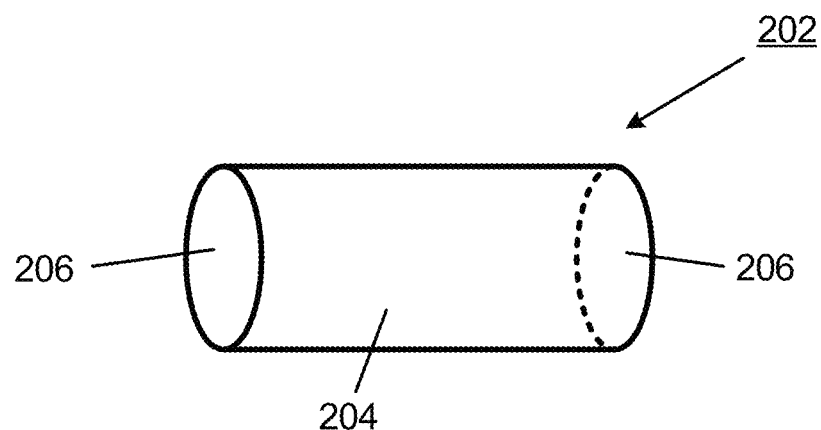
FIG. 16 represents a rectangular-shaped support tube 202 for the filter membranes inside the filter press.
Figure 17:
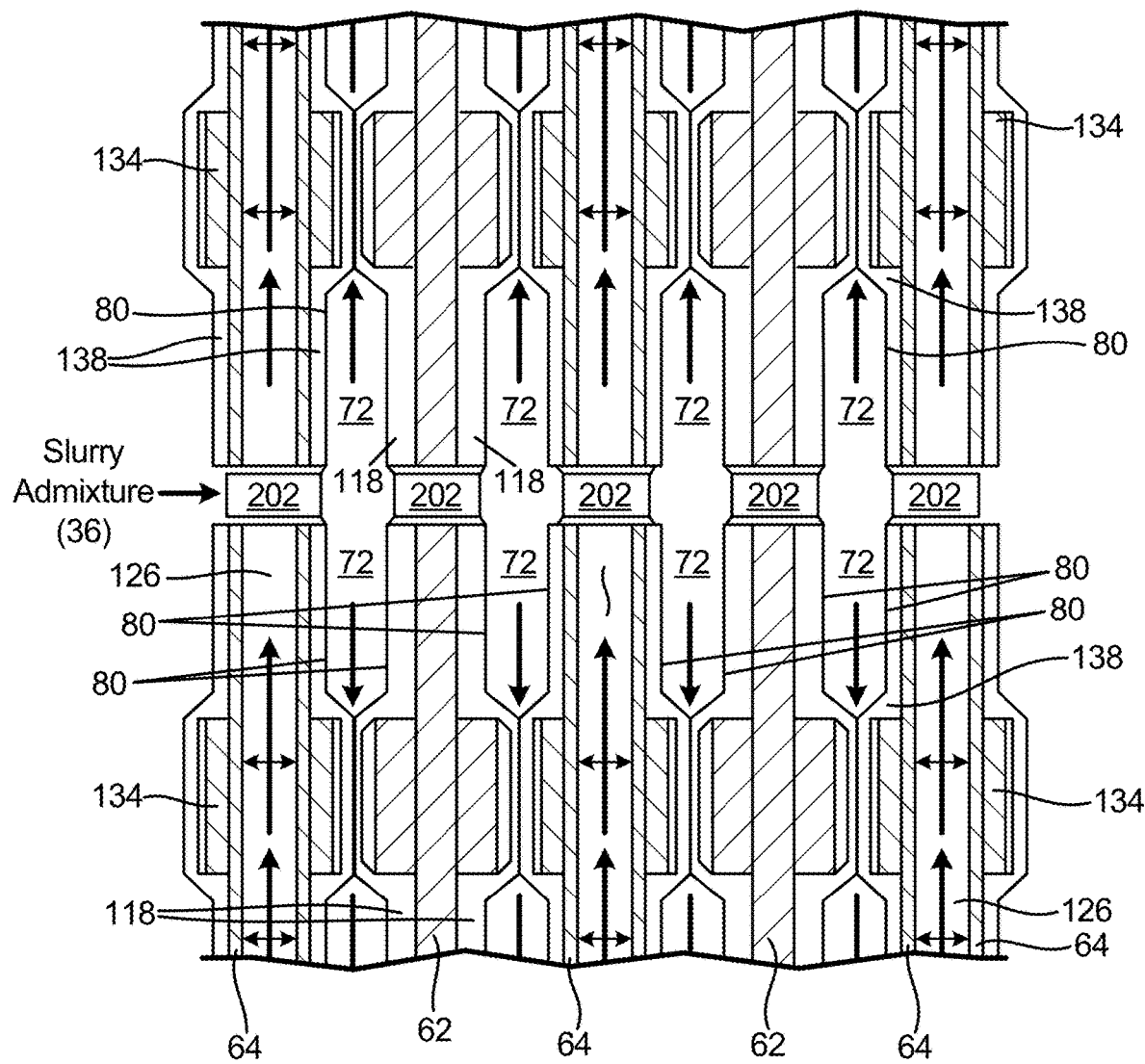
FIG. 17 represents the partial cut-away view of FIG. 14 in which the rectangular-shaped support tubes 202 are inserted into the central core passageway in the alternating filter plates and expansion plates to stretch the filter membranes 80 whose bottom edges are attached to the ends of the support tubes to reduce drooping of the filter membranes.

It has been discovered that such bulging of the filter membrane fabric around the inlets between central core passageway 70 and fill chambers 72 may be substantially reduced or even eliminated by connecting to the lower edge of the fabric of filter membrane 80 a support tube 202 that is shown in FIG. 16. Such support tubes contain a sidewall 204 made from a suitable material like vinyl plastic that defines a through passage 206. A support tube 202 is inserted into each central hole 70 in filter plates 62 and expansion plates 64 with the ends of the support tubes extending slightly beyond the walls of filter plates 64 and the side walls of hollow expansion plates 64, as shown in FIG. 17. The lower edges of the two filter membranes 80 covering, e.g., the opposite faces of filter plate 62 are then sewn to the protruding ends of the support tube to stretch the filter membranes taught. This substantially reduces sagging of the filter membranes into the open portions of central core passageway 70 between the adjacent filter plates 62 and expansion plates 64, while still permitting slurry admixture 36 to flow through the collective central core passageway 70 and into the fill chambers 72, because the through passage 206 of support tubes 202 are positioned co-axially within central core passageway 70 through the adjacent filter plates 62 and expansion plates 64.

Figure 18:
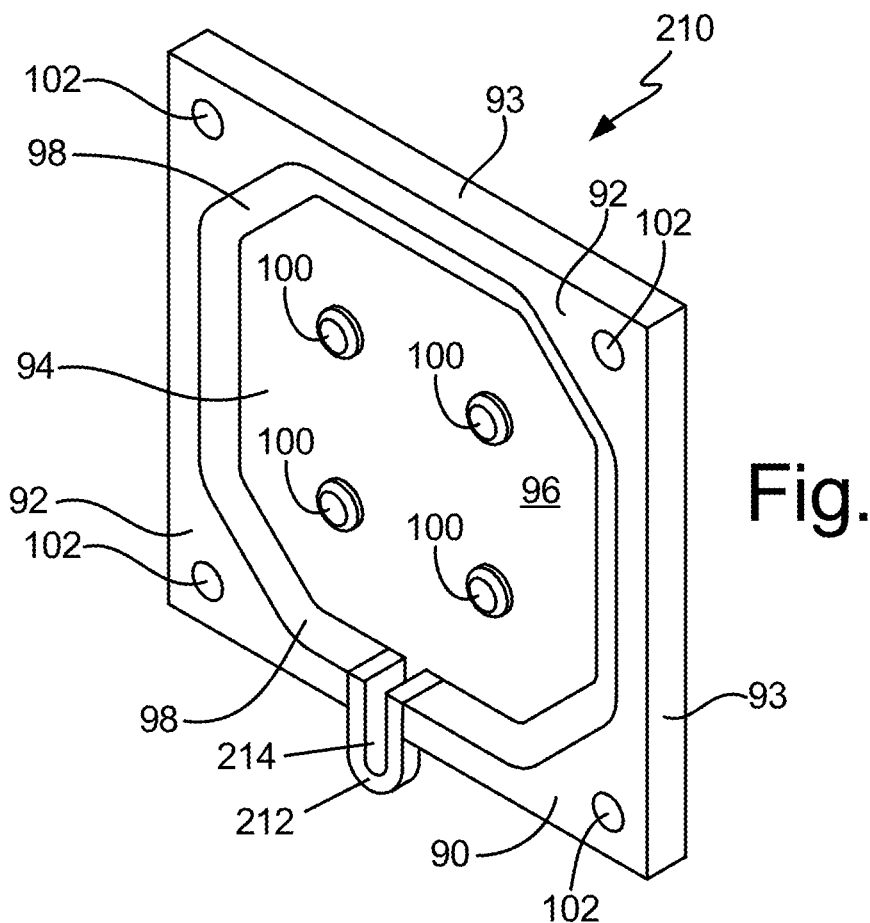
FIG. 18 represents a perspective view of a second embodiment of the solid filter plate/cavity plate used within the filter press of FIG. 2 in which the through hole in the dependent tongue that extends from the bottom of the filter plate forms the central core passageway below the filter press.
Figure 19:
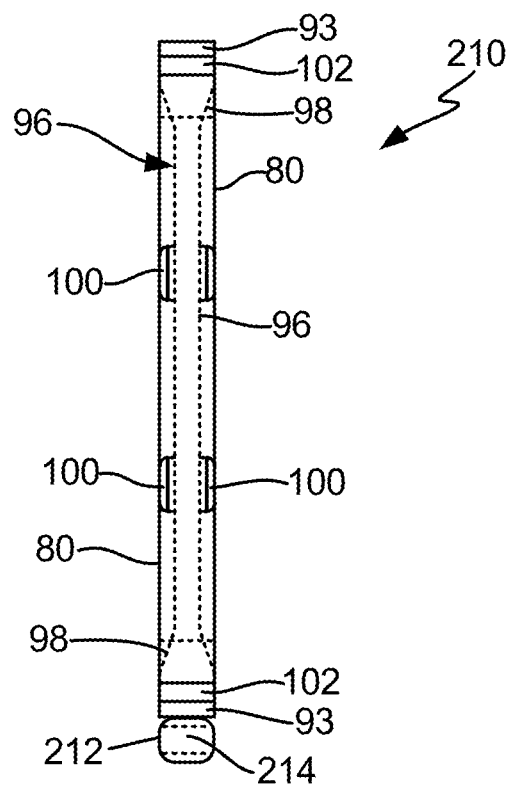
FIG. 19 represents an end view of the solid filter plate/cavity plate of FIG. 18.

FIGS. 18-19 show a second embodiment of filter plates 210 in which parts of it that are similar to filter plate 62 bear the same element members for ease of understanding. However, instead of this filter plate 210 having a central core passageway 70 passing through the center of the filter plate, as shown in FIGS. 4-5, the central core passageway 214 of filter plates 210 is provided by a metal tongue 212 that extends from the bottom edge 93 of the filter plate with a through hole 214 formed therein. At the same time, the bottom portion of flat outer perimeter surface 92 formed in the panel 90 bears a vertical cut-out region 216 that openly communicates with through hole 214 with the depressed cavity region 94 formed between flat wall 96, slanted sidewalls 98, and the associated filter membrane 220 that is attached to the perimeter surface 92 of the side walls of the filter plate 210. In this manner, the slurry admixture 36 passing through the central core passageway 214 formed by the closely adjacent filter plates 210 and expansion plates 230 can freely pass into the fill chambers 72 during the fill cycle 150.

Figure 20:
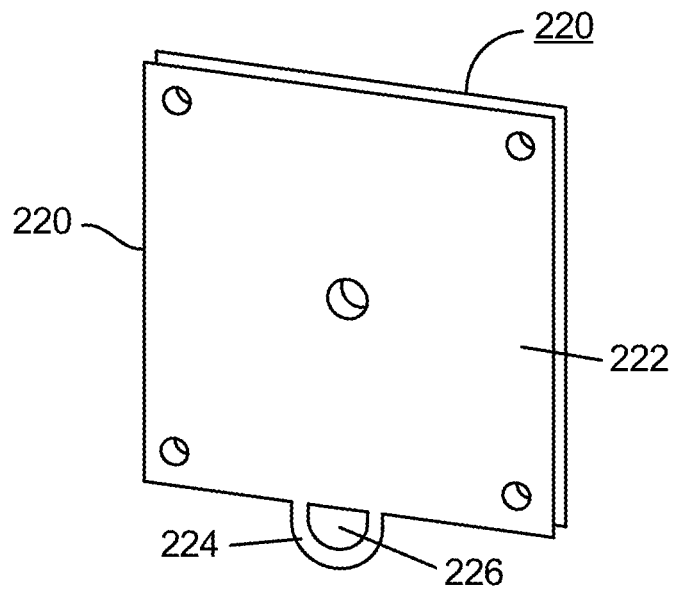
FIG. 20 represents a perspective view of a second embodiment of the filtration membrane used within the filter press of FIG. 2.
Figure 21:
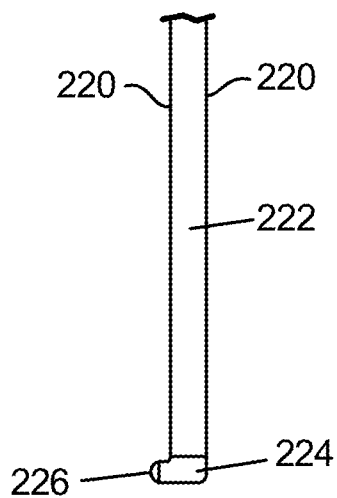
FIG. 21 represents an end view of the filtration membrane of FIG. 20.

Filter membrane 220 is shown in FIGS. 20-21. It preferably comprises Clear Edge Filtration Group's 321x fabric product 222 that is discussed above. Extending downward from fabric panel 222 is u-shaped region 224 having a hole 226. This u-shaped region fits over tongue 212 of filter plate 210 when the filter membrane 220 is attached to the face of the filter plate.

Figure 22:
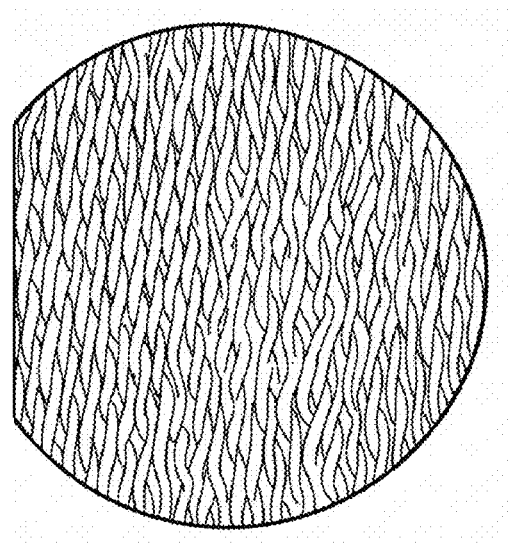
FIG. 22 represents a photomicrograph of the smooth surface face of the filtration membrane of FIG. 6.
Figure 23:
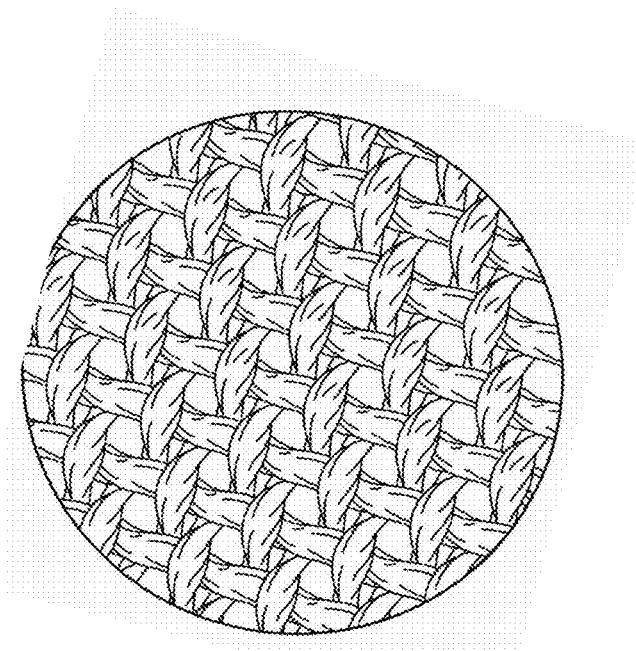
FIG. 23 represents a photomicrograph of a opposite, rough surface face of the filtration membrane of FIG. 6.

An important feature of this filter membrane product is that it features fiber weaves that produce a smooth surface face with the treads 226 being vertical in orientation, as shown in the photomicrograph of FIG. 22. The opposite surface face of the filter membrane 220 is rough, as shown in FIG. 23. A filter membrane 220 is attached to each opposing face of filter plate 210, so that its rough surface face is positioned against the cavity of the filter plate 210 with its smooth surface face adjacent to the fill chamber 72. This smooth surface face of the filter fabric prevents too many of the peat fibers contained in the slurry admixture 36 from penetrating into the openings of the fiber weave of the filter during the squeeze cycle 152, a condition otherwise that would prevent the filter cake 160 produced during the squeeze cycle from separating from the adjacent filter membranes forming fill chamber 72 to drop down out of filter press 60 when the plates are opened.

Figure 24:
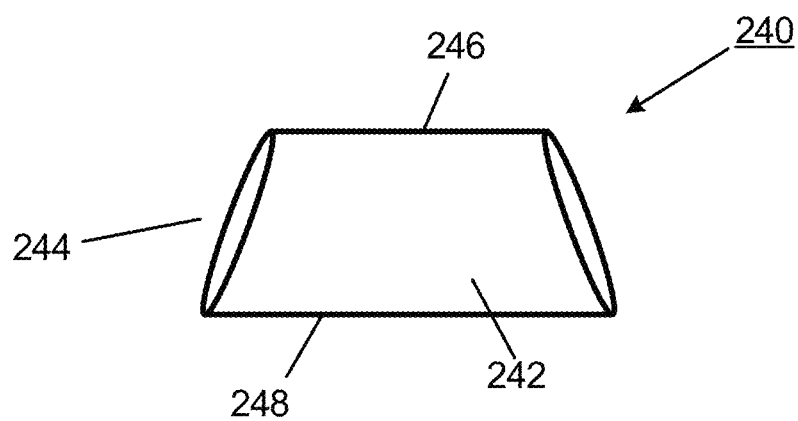
FIG. 24 represents a perspective view of a second embodiment of the hollow filter frame/expansion plate used with the filter press of FIG. 2.

FIGS. 24-25 illustrate the corresponding second embodiment of expansion plates 230. For its parts that are similar to the expansion plate 64 of FIGS. 10-11, the same element numbers have been used for each of understanding. Just as for filter plate 210, this expansion plate 230 does not bear a center through hole 70 at its center point. Instead, metal tongue 232 extends downwardly from bottom end wall 124 of lower outerwall 120 of the expansion plate 230 with through hole 214 formed therein. A vertical cutout region 234 formed in lower outerwall 120 of the expansion plate openly communicates through hole 214 with the shallow cavity 138 of fill chamber 72 formed between central region 132, the perimeter edges of outerwalls 120 and the filter membrane 220 that is attached to the perimeter face 120 of expansion plate 230. These through holes 214 in dependent tongues 232 of the expansion plates 230 and dependent tongues 212 of filter plates 210 that alternate inside filter press 60 collectively form central core passageway 214 that runs along the bottom of the filter press.

Even more preferably, support tube 240 can adopt a trapezoidal shape as shown in FIG. 26. Such a support tube 240 once again contains sidewall 242 that defines through passage 244. However, the top "edge" 246 of sidewall 242 is shorter than the bottom "edge" 248. This structure causes the material of filter membrane 220 to be even further stretched by the shorter span of top edge 246 of support tube 240, so as not to be subjected to the abrasive core blow cycle 154 to the same degree as if the rectangular-shaped support tube 202 was used. Such trapezoidal-shaped support tube 240 also greatly reduces the abrasion compared with if no support tube is used.

The top edge 246 of trapezoidal-shaped support tube 240 should be about 2.0-2.75 inches in length, preferably about 2.25 inches in length. Meanwhile, the bottom edge 248 of trapezoidal-shaped support tube 240 should be about 2.75-3.5 inches in length, preferably about 2.5 inches in length. These dimensions for the support tube 240 are based upon the filter plates 210 and expansion plates 230 being about two inches thick.

Figure 27:
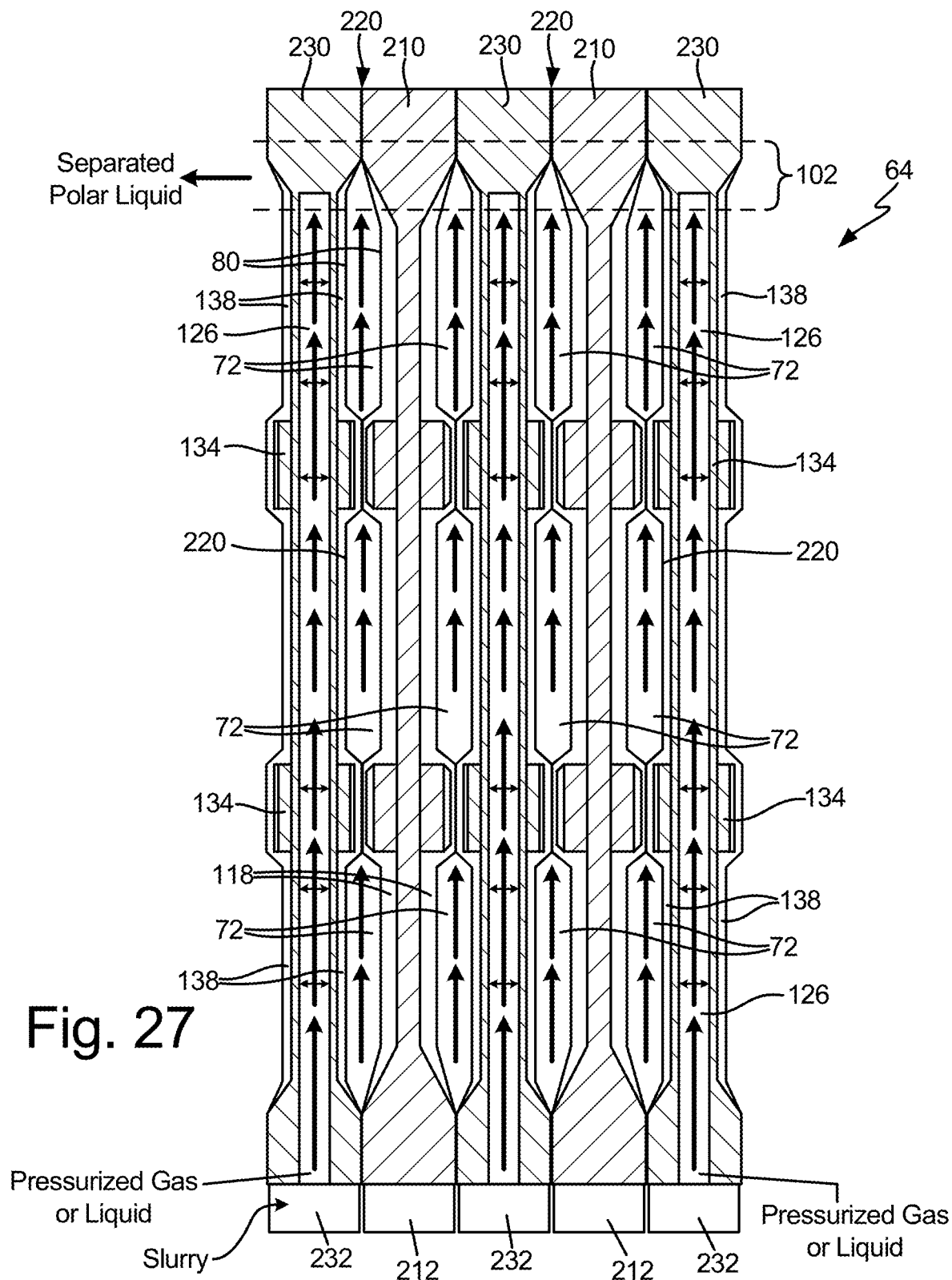
FIG. 27 represents a cross-sectional view of the plurality of alternating second embodiment solid filter plate/cavity plates and hollow filter frame/expansion plates for the filter press with the central core passageway depending from the bottom of the plates.

FIG. 27 shows a cross-sectional view of the arrangement of alternating filter plates 210 and expansion plates 230 with central core passageway 214 being formed by the dependent tongues 212 and 232 with their respective through holes extending from the bottom of the plates. In this embodiment, the slurry admixture 36 flows through the central core passageway 214 and into the fill chambers 72 formed by adjacent filter membranes 220. But in this case, a single fill chamber 220 extends vertically along the length of the filter plates 210 and expansion plates 230 from central core passageway 214 to outlet channel 102 in the top portion of the plates for the separated polar liquid that is collected in chambers 118 on the other side of filter membranes from the slurry admixture 36 during the squeeze cycle 152.

Figure 28:
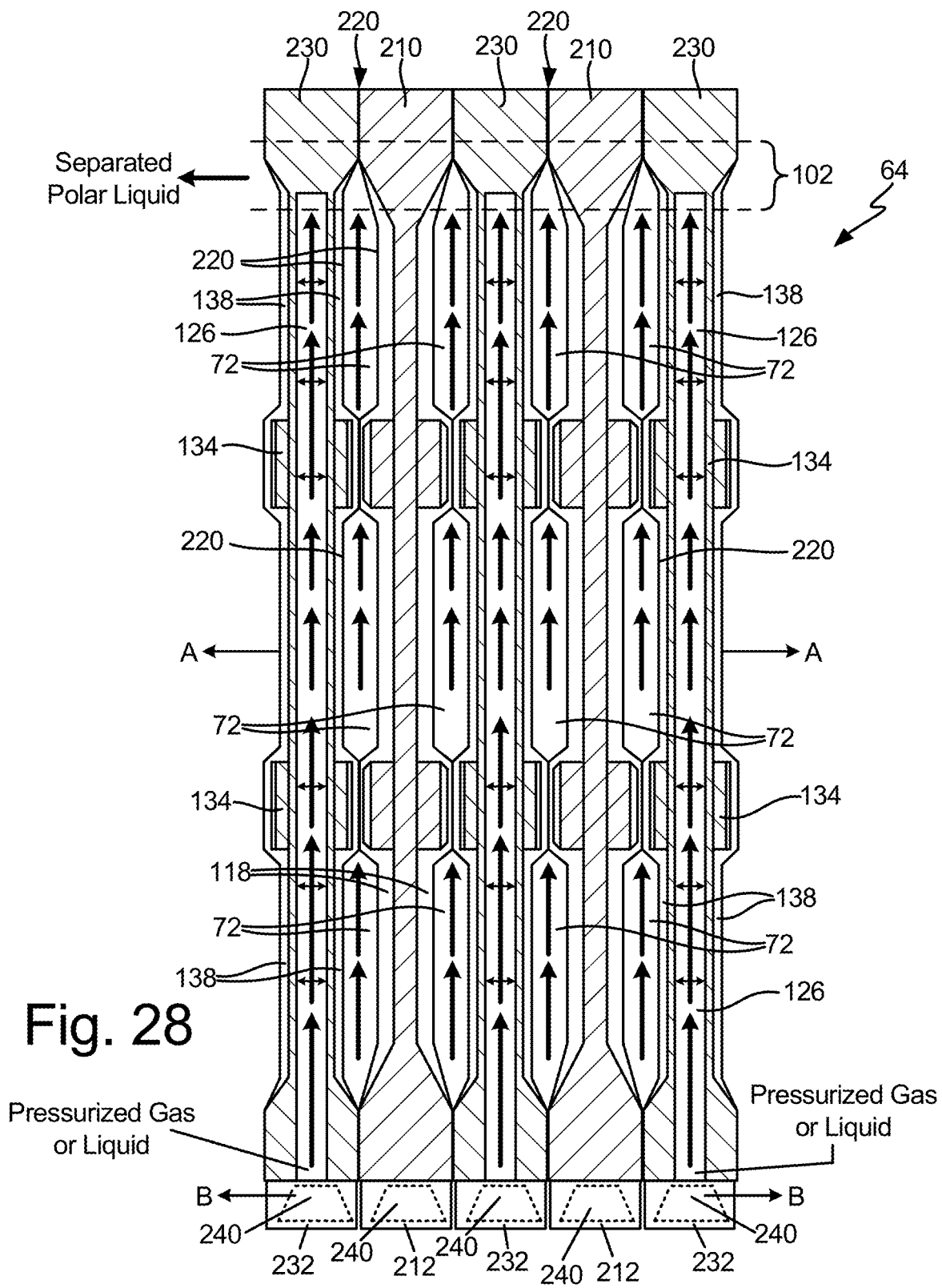
FIG. 28 represents the second embodiments arrangement of the filter plates and expansion plates of FIG. 27 with the trapezoidal-shaped support tubes inserted into the through passages of the dependent tongues of the filter plates and expansion plates, and the bottom edges of the filter membranes attached to the ends of the support tubes.

FIG. 28 is similar to FIG. 25 except that trapezoidal-shaped support tubes 240 have been inserted inside tongues 212 and 232 that depend from the bottoms of filter plates 210 and expansion plates 230, respectively. The length of the support tubes run parallel to the longitudinal axis A-A of the assembled filter plates with their through passages being co-axial with the central core passageway 214. The bottom edges of filter membranes 220 are sewed and secured to the opposite ends of upper edge 246 of trapezoidal-shaped support tube 240, as shown in FIG. 28. Because of the shorter length of this upper edge compared with the bottom edge 248 of the support tube that approximately equals the length of the through passage 214 in the dependent tongues 212 and 232, the filter membranes are stretched even more taughtly when their bottom edges are attached to the shorter ends of the upper edge 246 of trapezoidal-shaped support tube 240 compared with if rectangular-shaped support tube 202 is used. This trapezoidal-shaped support tube therefore further reduces the sagging of the filter membranes 220 into central core passageway 214 that otherwise would lead to abrasion of the filter membranes during the core blow cycle 154 of the filter press 60 and premature replacement of the filter membranes.

An important variable for the partially-decomposed organic matter demoisturizing process 10 of the present invention is control of the squeeze cycle pressure. For a peat-based partially-decomposed organic material slurry, this squeeze cycle pressure contributed by the fluidizing gas or liquid (e.g., compressed air) introduced into filter press 60 should be about 10-90 psi, preferably less than about 62 psi. Other types of partially-decomposed organic material that do not include peat will not tend to polymerize under pressure as peat does. Therefore, the squeeze cycle pressure for slurries not containing peat should be maintained at a pressure <200 psi.

Peat under pressure caused by the fluidizing gas or liquid during the squeeze cycle will produce polymerization of the peat components. At low temperatures around 40° F. and a pressure around 60 psi, this polymerization mechanism seems to occur, which is surprising. Under a 200 psi squeeze cycle, the peat particles contained in the slurry mixture 36 polymerizes into the filter membrane fabric apertures 112 to render the membrane virtually impermeable. It has been found that squeeze cycle pressures ≤75 psi avoids this unwanted polymerization.

Control of the duration of the squeeze cycle is also crucial for the partially-decomposed organic material demoisturization process 10. If polymerization of the peat particles contained inside the slurry mixture 36 during the squeeze cycle is avoided, then a shorter squeeze cycle can be realized to achieve the desired liquid/solid separation mechanism. For slurry mixtures containing peat and a squeeze cycle pressure of about 62 psi, the squeeze cycle duration may be about 15-45 minutes, preferably about 18-25 minutes, to achieve a moisture reduction range of about 70% wt±0.5% wt in the resulting filter cake 160. For non-peat materials in the slurry mixture 36, the squeeze cycle duration may be about 5-20 minutes.

It has also been found that finely ground $CaCO_3$ may be added to the polymer agent 47 introduced into the slurry mixture at the junction point 42 to enhance migration of water from the slurry during the squeeze cycle in filter press 60. NS9010 polymer sourced from NeoSolutions is preferably used. A 10%/90% polymer/water mixture ratio should be employed with the resulting solution making up about 10% of the overall slurry mixture. The $CaCO_3$ particles should be ground so that about 80% of them are below −200 mesh (ca. 75 μm) in size. This finally ground $CaCO_3$ is introduced into the polymer at about ≤0.4% wt.

It is believed that peat particles normally hold water through hydrogen bonding. But the polymer introduces positively-charged cations ($Ca^{+2}$) into the slurry mixture to weaken these hydrogen bonds that otherwise bind water to the peat particles. Thus, this polymer helps to separate water from the peat particles during the squeeze cycle 152 in the filter press 60. Calcium cations from the $CaCO_3$ agent contribute additional cations to this cause.

The demoisturizing process 10 using a filter press without the application of thermal heat or steam of the present invention provides several benefits. First, elimination of the need for combustion heat common to thermal and thermal-mechanical processes used in the industry can substantially save on operating costs, since sources of combustion fuel can be expensive. Second, avoidance of dryers for a demoisturizing process eliminates emissions that can be expensive and cumbersome to treat under environmental regulations existing in many countries. Even if the present process relegates dryers to supplemental heating needed to further reduce the moisture level of the partially-decomposed organic material, the combustion fuel, operating, and regulatory compliance costs can still be substantially reduced.

Third, for manufacturing plants that already use equipment like a dryer to reduce the moisture content of partially-decomposed organic material, the addition to the manufacturing operation of the moisture-reduction process using a filter press without the use of thermal heat of superheated stem under this invention will increase plant operating capacity. For example, one peat manufacturer is doubling its plant operating capacity by adopting the filter press-based moisture reduction process of this invention to reduce the moisture level of the peat material, and then using the already-existent dryers for supplemental moisture reduction of the peat material exiting the filter press.

Fourth, the removal of debris within the partially-decomposed organic material, and demoisturizing via the filter press provides a more uniform product in its composition, compared with prior art processes. This can provide substantial benefits for end-use applications for the fibrous organic matter. For example, it has been discovered that peat processed by the filter press-based demoisturizing process 10 of the present invention is much easier to pelletize. This may be due to the positive impact on the fibers within the peat material caused by the pressures applied within the filter press.

In another embodiment of the partially-decomposed organic material demoisturizing process 10 of the present invention, the permeable membranes 80 in the filter press 60 may be pre-coated with material to increase separation of the filter cake from the membrane when the filter press is opened after the squeeze cycle 151 is completed, and to achieve rapid migration of the polar liquid during the fill cycle 150 and the squeeze cycle 152. Prior art filter press processes utilize materials like perlite or diatomaceous earth. However, under the present invention, very fine particles of the same partially-decomposed organic material that is being treated inside the filter press may be used as the pre-coating agent. For example, when peat is treated inside the filter press, minus-30-mesh peat fines screened from BioAPT peat granules sold by American Peat Technology of Aitkin, Minnesota may be beneficially used as the pre-coating agent for the membranes with the result that a different substance like perlite or diatomaceous earth does not contaminate the demoisturized peat product.

The following example illustrates the process of the present invention for producing demoisturized partially-decomposed organic material.

Example 1

Reed sedge peat material at a 78% wt moisture content ("MC") was subjected to hand screening using a screen having ½-inch openings. A slurry admixture was then prepared by adding 7,900 lbs of the resulting ½-inch-minus peat particles to 11,424 lbs of water to produce a 91% wt MC slurry.

A 800 mm pilot filter press from FlowPress was used for the demoisturizing process. It contained five cavity plates and six expanded plates in an alternating arrangement.

The 19,324 lbs of peat-water slurry admixture was introduced to the filter press in multiple 7,900 lbs batches due to the overall volume exceeding the capacity of the filter press. Each fill cycle operated at 145 psi for 22 minutes. Compressed air at 165 psi was injected into the expanded plates to commence each squeeze cycle which was conducted for 28 minutes to complete the liquid-solid separation inside the filter press. Ten filter cakes were produced by each cycle of the filter press.

A total of 4,694 lbs of peat filter cake was produced from the filter press. Moisture analysis determined that it contained 63% wt water. A total of 14,630 lbs of water was discharged from the filter press.

In order to further reduce the moisture content of the 63% wt MC peat, it was fed to a horizontal rotary dryer ("Dryer #1") operating with an inlet temperature of 1100° F., an outlet temperature of 400° F., and 19,000 cfm of air flow. After 90 seconds of time spent inside Dryer #1, the resulting peat particles were analyzed for moisture content which evidenced a 38% wt MC.

Figure 29:
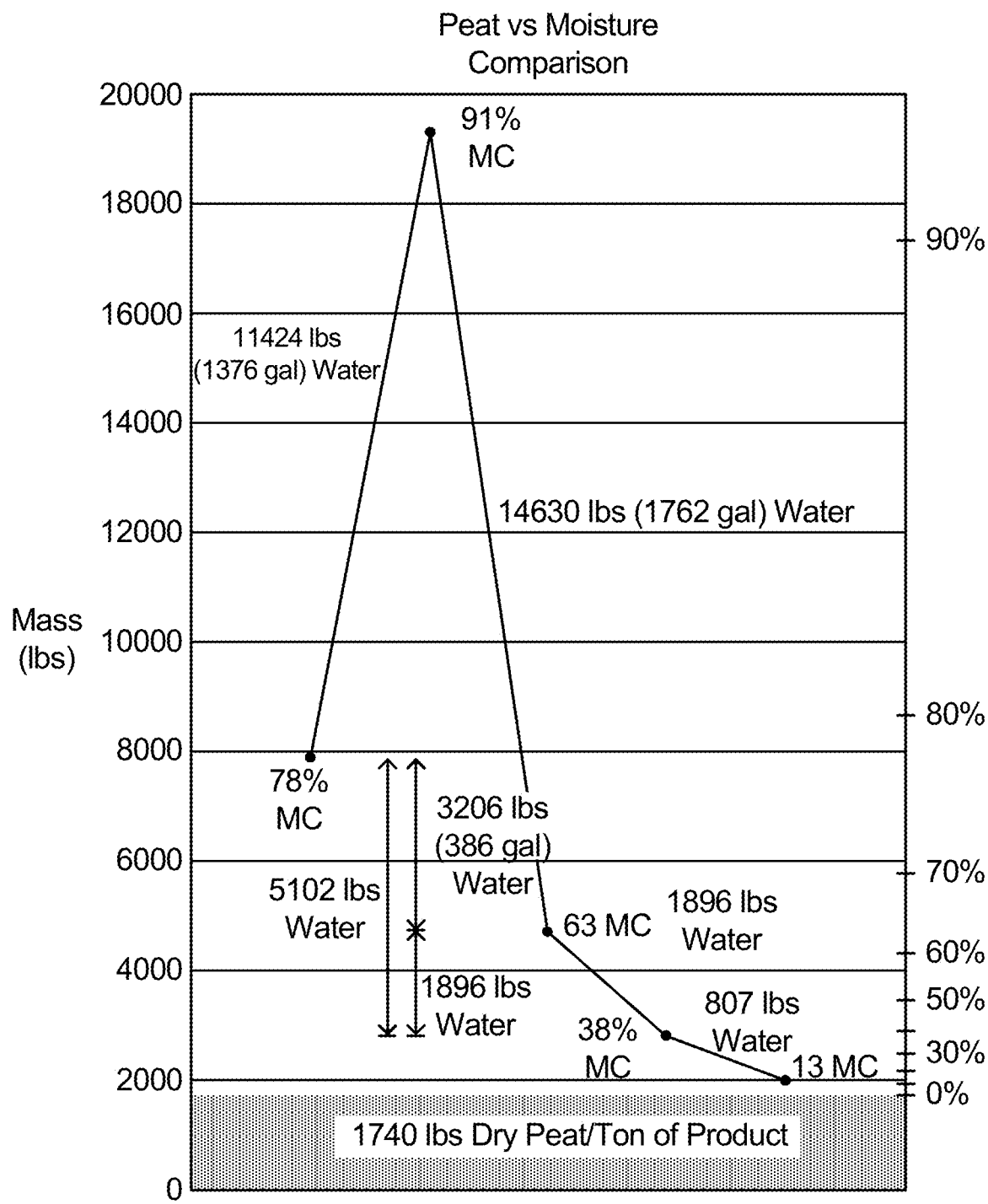
FIG. 29 represents a graphical depiction of the moisture additions to and reductions from the peat substrate during the demoisturizing process of the present invention and supplemental drying, compared with the moisture reductions achieved by conventional drying processes.

As FIG. 29 illustrates, a dryer used to reduce the 78% wt moisture content peat feed material down to 38% wt MC would have removed 5,102 lbs of water from the peat feed material. However, by using the filter press within the demoisturizing process of the present invention first to reduce the moisture level of the peat feed material from 91% wt to 63% wt, a net 3,206 lbs of water was removed. This was in spite of the fact that 11,424 lbs of water was added to the peat to create the 91% wt MC slurry admixture fed to the filter press. This meant that only 1,896 lbs of water had to be removed from the 63% wt MC peat in Dryer #1, resulting in substantial cost savings on reduced operating expenses.

The 38% wt MC peat material was then treated inside Dryer #2 comprising a horizontal rotary dryer operating with an inlet temperature of 1500° F., an operating temperature of 210-220° F., and 11,000 cfm of drying gas flow. After 45 minutes, the peat material was removed from the Dryer #2 and the moisture content was measured as 13% wt MC. The amount of water removed by Dryer #2 was 807 lbs.

Under the present invention, the dryer 170, scrubber 178, and filter press 60 collectively provide a synergistic effect to the overall partially-decomposed organic material demoisterizing process 10. The filter press 60 reduces moisture in the filter cake 160, while also producing clean filtrate polar liquid (e.g., water) that is separated by and exits the filter press. The scrubber 178 removes fine particles of the partially-decomposed organic material (e.g., peat) from the dryer exhaust gas, while also heating the filtrate water recycled from the filter press and acting as a heat exchanger. The dryer 170 further reduces the moisture in the filter cake 160 produced by the filter press 60, while contributing heat content to the filtrate water recycled to the slurry mixture to melt ice contained in the peat material that has been added to the slurry mixture. This is a highly efficient process by design that reduces the cost of producing a high-quality, low moisture filter cake.

The above specification, drawings, examples, and data provide a complete description of the process and its resulting products of the present invention. Since many embodiments of the invention can be made without departing from the spirit and scope of the invention, the invention resides in the claims hereinafter appended.

We claim:
1. A process for the demoisturization of a partially-decomposed organic material containing a polar liquid, comprising the steps of:
    (a) supplying an amount of the partially-decomposed organic material containing the polar liquid having an initial moisture content to a mixing tank;
    (b) adding an amount of the same polar liquid to the mixing tank to produce a slurry admixture comprising the organic material and the polar liquid, said slurry admixture having a moisture content of about 90-99% wt that is greater than the initial moisture content;
    (c) introducing the slurry admixture to a filter press comprising:
        (i) a first inlet port for the slurry admixture;
        (ii) a plurality of alternating cavity plates and expansion plates operably movable between a closed position and an opened position, each of the cavity plates and expansion plates having a through hole;
        (iii) the through holes in the cavity plates and expansion plates collectively producing a central core passageway having a first longitudinal axis for the slurry admixture when the cavity plates and expansion plates are in their closed position;
        (iv) a first filter membrane attached to each cavity plate to define a polar liquid fill chamber between the cavity plate and the first filter membrane;
        (v) a second filter membrane attached to each expansion plate to define a polar liquid fill chamber between the expansion plate and the second filter membrane;
        (vi) a slurry fill chamber defined by each set of adjacent membranes associated with the respective cavity plate and the expansion plate, the slurry fill chamber operably communicating with the central core passageway;
        (vii) a second inlet port in each expansion plate for a pressurized gas or liquid;
        (viii) an outlet port in each cavity plate and expansion plate for discharge of separated polar liquid;
    (d) a source of pressurized gas or liquid;
    (e) a support tube having a first end and a second end and a through passageway having a second longitudinal axis, a support tube being inserted into each of the through holes in the cavity plates and the expansion plates with their second longitudinal axis being coaxial with the longitudinal axis of the central core passageway, the bottom lateral edge of the two filter membranes that are attached to the opposite faces of the cavity plate or expansion plate in turn being secured to the first end and second end of the support tube, respectively;
    (f) wherein when the cavity plates and expansion plates are moved to their closed position, the slurry admixture is introduced through the central core passageway and the support tube through passageway and into the slurry admixture fill chambers under pressure during a fill cycle followed by introduction of the pressurized gas or liquid into the expansion plates during a subsequent squeeze cycle to deflect a wall of each expansion plate into its adjacent slurry admixture fill chamber to force the slurry admixture through the adjacent filter membranes to discharge a portion of the liquid within the slurry admixture into the associated polar liquid fill chambers, leaving a filter cake comprising the partially-decomposed organic material and the remaining polar liquid having a moisture content less than the initial moisture content inside the slurry admixture fill chamber;
    (g) wherein the filter membranes are pulled taught by their support tube so that the filter membranes do not droop into the central core passageway; and
    (h) wherein when the cavity plates and expansion plates are moved to their open position upon completion of the squeeze cycle, the filter cake is discharged from the slurry admixture fill chambers of the filter press, and the separated polar liquid is discharged from the polar liquid fill chambers of the filter press.

2. The process of claim 1, wherein the lateral side cross-sectional shape of the support tube is rectangular.

3. The process of claim 1, wherein the lateral side cross-sectional shape of the support tube is trapezoidal.

4. The process of claim 1, wherein the pressure condition of the slurry admixture introduced into the slurry admixture fill chambers of the filter press is about 120-200 psi.

5. The process of claim 1, wherein the duration of the fill cycle for the filter press is about 15-45 minutes.

6. The process of claim 1, wherein the pressure condition for the pressurized gas or liquid introduced into the expansion plates during the squeeze cycle of the filter press is about 100-400 psi, where the partially-decomposed organic material comprises peat.

7. The process of claim 1, wherein the duration of the squeeze cycle for the filter press is about 15-60 minutes where the partially-decomposed organic material comprises peat.

8. The process of claim 1, wherein the filter membranes comprise a woven substrate comprising a plurality of orderly or random-oriented crossed fibers defining a plurality of apertures.

9. The process of claim 8, wherein the fibers are made from a material of the group consisting of polypropylene, polyester, chinlon, chinlon/polyester mix, nylon, vinylon, and pure cotton.

10. The process of claim 8, wherein the filter membrane has a flow rate value of about 60-1000 cfm measured using an air stream at a pressure equal to 0.5 inches of water column passing through the membranes' membrane's apertures.

11. The process of claim 8, wherein each filter membrane has a smooth face and a rough fact opposite to the smooth face, the smooth face of each filter membrane facing the slurry fill chamber and the filter cake formed therein.

12. The process of claim 1, wherein the partially-decomposed organic material supplied to the mixing tank has a moisture content of about 80% wt.

13. The process of claim 1, wherein the partially-decomposed organic material is selected from the group consisting of peat, composted media, crop byproduct residues, distiller's grains, silage, lignite coal, charcoal, torrefied wood chips, partially-decomposed wood, Biochar, and combinations thereof.

14. The process of claim 13, wherein the composted media is selected from the group consisting of leaf compost media, grass compost media, composted manure, and composted wood chips.

15. The process of claim 1, wherein the polar liquid is selected from the group consisting of water, an alcohol, ammonium ($NH_3$), water solutions containing inorganic compounds, and industrial or food acids.

16. The process of claim 1 further comprising screening the slurry admixture to remove unwanted materials before introducing the slurry admixture to the filter press.

17. The process of claim 1 further comprising introducing into the slurry admixture a coagulant before the slurry admixture is delivered to the filter press.

18. The process of claim 17, wherein the coagulant comprises a cationic coagulant with 1-20 percent organics such as polyamine within the slurry admixture.

19. The process of claim 1 further comprising introducing into the slurry admixture a polymer to help the polar liquid to migrate from the partially-decomposed organic matter matrix during the squeeze cycle.

20. The process of claim 19 further comprising finely-ground calcium carbonate particles that are added to the polymer to enhance migration of the polar liquid from the slurry admixture during the squeeze cycle.

21. The process of claim 1 further comprising introducing into the slurry admixture a flocculant before the slurry admixture is delivered to the filter press.

22. The process of claim 21, wherein the flocculant comprises an aluminum-based, low-molecular weight, low-charge anionic flocculant with a charge density of 0-30% added to the slurry admixture within a 10-15% wt range.

23. The process of claim 1 further comprising precoating the surface of at least one filter membrane with a fine-particle material comprising the same partially-decomposed organic material contained within the slurry admixture.

24. The process of claim 23, wherein the fine-particle precoat material has a particle size equal to or less than minus-30-mesh.

25. The process of claim 1, wherein the partially-decomposed organic material containing the polar liquid comprises a peat and water admixture.

26. The process of claim 25, wherein the moisture content of the peat filter cake discharged from the filter press is about 60-75% wt, and about 50-80% wt where the peat filter cake also contains Biochar.

27. The process of claim 1, wherein the squeeze cycle pressure produced by the fluidizing gas entering the cavity plate is about 62 psi or lower.

28. The process of claim 27, wherein the duration of the squeeze cycle is about 18-25 minutes.

29. The process of claim 1 further comprising a chain with each of its ends being secured the adjacent expansion plate or filter plate, so that when the filter press is moved to its open position, movement of the expansion plate or filter plate will operably produce concurrent movement of the other plate by the chain to reduce the discharge time for the filter cake from the filter press by half.

30. The process of claim 1 further comprising subsequent treatment of the discharged filter cake in a separate thermal drying or mechanical demoisturizing means for further reducing the moisture content of the filter cake.

31. The process of claim 30, wherein the thermal drying produces exhaust gas, and the process further comprising extraction of heat content from the exhaust gas of the thermal dryer to warm the slurry admixture or the separated polar liquid produced by the filter press that is recycled to the slurry admixture.

32. The process of claim 30, wherein the thermal drying process produces exhaust gas, and the process further comprising removal of fine particles of the partially-decomposed organic matter from the exhaust gas that are recycled to the slurry admixture.

\* \* \* \* \*